(12) United States Patent
Woods, Jr.

(10) Patent No.: US 11,404,765 B2
(45) Date of Patent: Aug. 2, 2022

(54) RETRACTABLE PHASED ARRAY FOR MOBILE DEVICES

(71) Applicant: GlaiveRF, Inc., Burlington, MA (US)

(72) Inventor: Wayne H. Woods, Jr., Burlington, MA (US)

(73) Assignee: GLAIVERF, INC., Burlington, MA (US)

( * ) Notice: Subject to any disclaimer, the term of this patent is extended or adjusted under 35 U.S.C. 154(b) by 0 days.

(21) Appl. No.: 16/913,121

(22) Filed: Jun. 26, 2020

(65) Prior Publication Data

US 2021/0408670 A1 Dec. 30, 2021

(51) Int. Cl.
*H01Q 1/24* (2006.01)
*H04M 1/02* (2006.01)
*H01Q 21/22* (2006.01)

(52) U.S. Cl.
CPC ............ *H01Q 1/244* (2013.01); *H01Q 21/22* (2013.01); *H04M 1/0202* (2013.01)

(58) Field of Classification Search
CPC .......... H01Q 1/088; H01Q 1/244; H01Q 1/38; H01Q 21/30
USPC ................... 455/550.1, 575.7; 343/702, 901
See application file for complete search history.

(56) References Cited

U.S. PATENT DOCUMENTS

| | | | |
|---|---|---|---|
| 5,434,582 A * | 7/1995 | Koike | H01Q 1/10 343/702 |
| 5,497,506 A * | 3/1996 | Takeyasu | H01Q 1/244 379/433.11 |
| 5,572,224 A * | 11/1996 | Moller | H01Q 1/242 343/702 |
| 5,949,369 A | 9/1999 | Bradley et al. | |
| 6,097,934 A * | 8/2000 | Spall | H01Q 11/08 455/575.7 |
| 6,239,756 B1 | 5/2001 | Proctor, Jr. et al. | |
| 6,911,943 B2 * | 6/2005 | Ryou | H01Q 1/242 343/702 |
| 7,034,759 B2 | 4/2006 | Proctor, Jr. et al. | |
| 7,576,699 B2 | 8/2009 | Gilmore et al. | |
| 8,274,443 B2 | 9/2012 | Hauhe et al. | |
| 8,560,031 B2 | 10/2013 | Barnett et al. | |
| 8,643,562 B2 | 2/2014 | Chang et al. | |
| 9,172,070 B2 | 10/2015 | Huang et al. | |
| 10,090,578 B2 | 10/2018 | Wolentarski et al. | |

(Continued)

FOREIGN PATENT DOCUMENTS

| | | |
|---|---|---|
| CN | 103765674 | 4/2014 |
| WO | 2012101282 | 8/2012 |

OTHER PUBLICATIONS

Naqvi et al., "Review of Recent Phased Arrays for Millimeter-Wave Wireless Communication", sensors, Sep. 21, 2018, 31 pages.

(Continued)

*Primary Examiner* — Tan H Trinh
(74) *Attorney, Agent, or Firm* — Andrew D. Wright; Roberts Calderon Safran & Cole, P C.

(57) ABSTRACT

An electronic device includes: a housing; a display; and an extendable phased array antenna structure integrated with the housing and moveable relative to the housing between a retracted position and an extended position. The extendable phased array antenna structure comprises an array of antenna elements that are configured to form a beam in a determined direction.

24 Claims, 15 Drawing Sheets

(56) References Cited

U.S. PATENT DOCUMENTS

| | | | |
|---|---|---|---|
| 10,296,047 B2 | 5/2019 | Kallman et al. | |
| 10,516,431 B2 | 12/2019 | DiLeila | |
| 2004/0113851 A1 | 6/2004 | Gothard et al. | |
| 2004/0119650 A1* | 6/2004 | Shively | H01Q 1/242 343/702 |
| 2004/0198411 A1* | 10/2004 | Cheng | H04W 88/02 455/550.1 |
| 2005/0168386 A1* | 8/2005 | Rogalski | H04B 1/38 343/702 |
| 2005/0195113 A1* | 9/2005 | Candal | H01Q 9/30 343/702 |
| 2006/0055624 A1* | 3/2006 | Garcia | H01Q 1/244 343/901 |
| 2006/0082507 A1* | 4/2006 | Tamez | H01Q 1/244 343/702 |
| 2006/0154708 A1* | 7/2006 | Bogner | H01Q 1/38 455/575.7 |
| 2007/0035454 A1* | 2/2007 | Zarnowitz | H01Q 1/244 343/702 |
| 2008/0074329 A1 | 3/2008 | Caballero et al. | |
| 2009/0058725 A1 | 3/2009 | Barker et al. | |
| 2010/0026589 A1* | 2/2010 | Dou | H01Q 21/28 343/702 |
| 2012/0300871 A1 | 11/2012 | Schroeder et al. | |
| 2013/0328723 A1 | 12/2013 | Rappaport | |
| 2015/0035714 A1 | 2/2015 | Zhou | |
| 2016/0181703 A1 | 6/2016 | Choudhury et al. | |
| 2016/0292669 A1* | 10/2016 | Tunnell | G06Q 20/3278 |
| 2016/0359596 A1* | 12/2016 | Wild | H04B 7/0695 |
| 2017/0141115 A1* | 5/2017 | Bower | H01L 27/0811 |
| 2017/0170859 A1 | 6/2017 | Noori et al. | |
| 2018/0031693 A1* | 2/2018 | Zielinski | G01S 13/756 |
| 2018/0310283 A1* | 10/2018 | Deenoo | H04L 5/0048 |
| 2019/0257933 A1 | 8/2019 | Nath et al. | |
| 2019/0305403 A1 | 10/2019 | Wang et al. | |
| 2020/0106192 A1 | 4/2020 | Avser et al. | |
| 2020/0119760 A1 | 4/2020 | Mizunuma et al. | |
| 2020/0161740 A1 | 5/2020 | Islam et al. | |
| 2021/0103031 A1* | 4/2021 | Cohen | G01S 7/411 |
| 2022/0006190 A1* | 1/2022 | Tran | H01Q 1/44 |

OTHER PUBLICATIONS

Bang et al., "MM-Wave Phased Array Antenna for Whole-Metal-Covered 5G Mobile Phone Applications", Department of Electronics and Computer Engineering, Hanyang University, 2017, 2 pages.

Zhou, "Phased Array for Millimeter-Wave Mobile Handset", Samsung Research America, 2014, 2 pages.

Unknown, "5G Millimeter Wave Frequencies And Mobile Networks", IWPC, Jun. 14, 2019, 203 pages.

Unknown, "Push-to-Close Latches with Pop-Out Knob", downloaded Jun. 25, 2020, 1 page.

Unkown, "Push-Button Tight-Hold Paddle-Handle Keyed Alike Cam Locks" downloaded Jun. 25, 2020, 1 page.

Hindle et al., "5G Phased Array Techonologies", Microwave Journal eBook, Sep. 2019, 37 pages.

International Search Report and Written Option of the International Searching Authority from PCT Application No. PCT/US21/38873 dated Oct. 1, 2021, 9 pages.

* cited by examiner

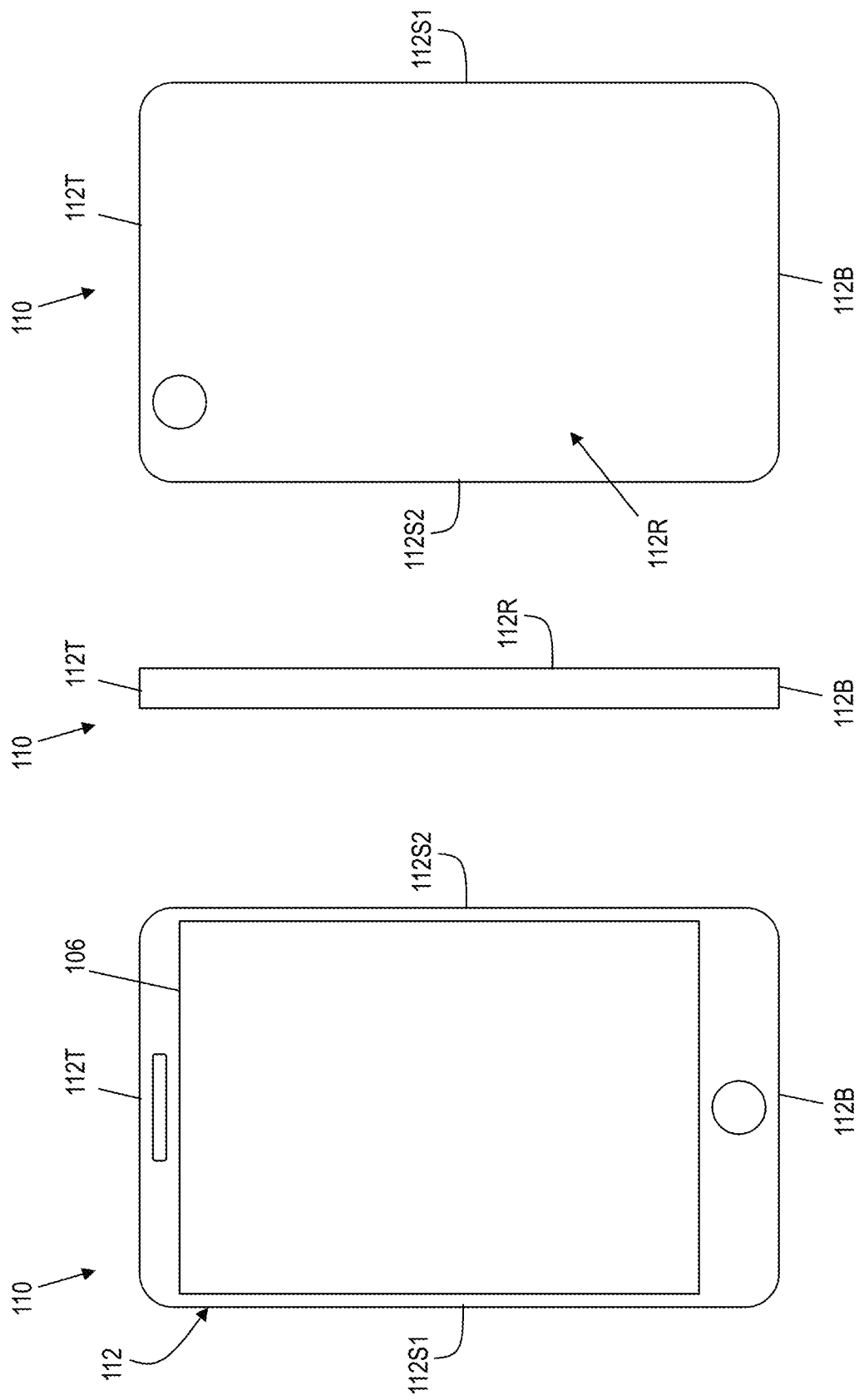

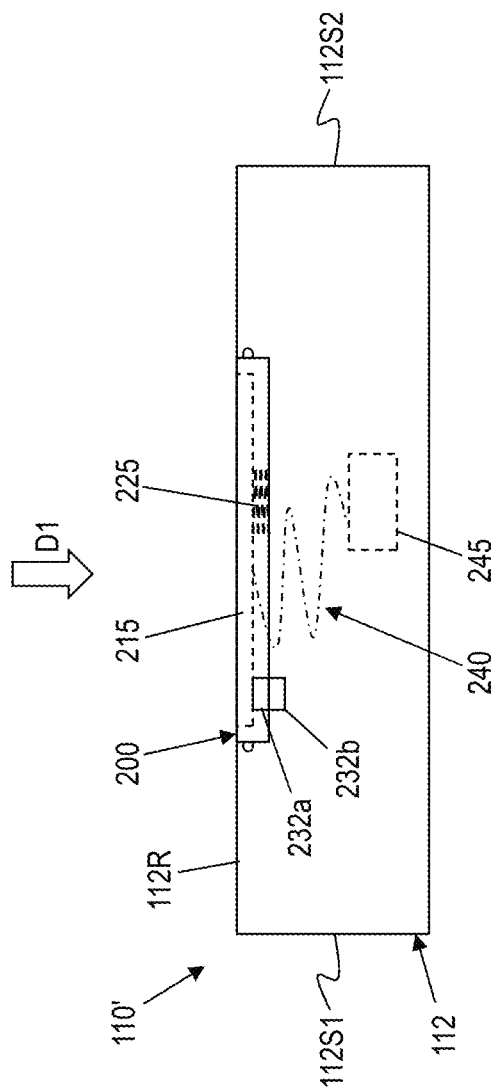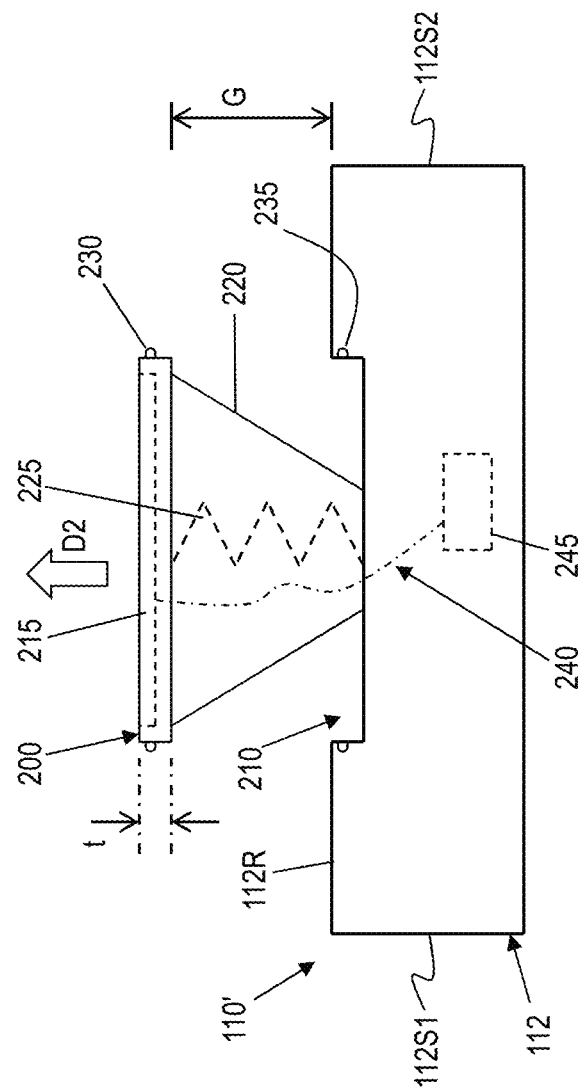

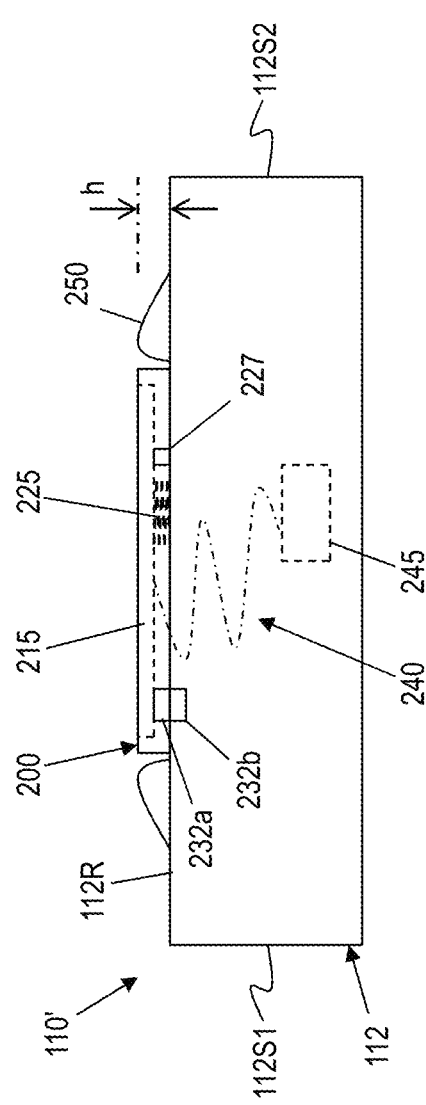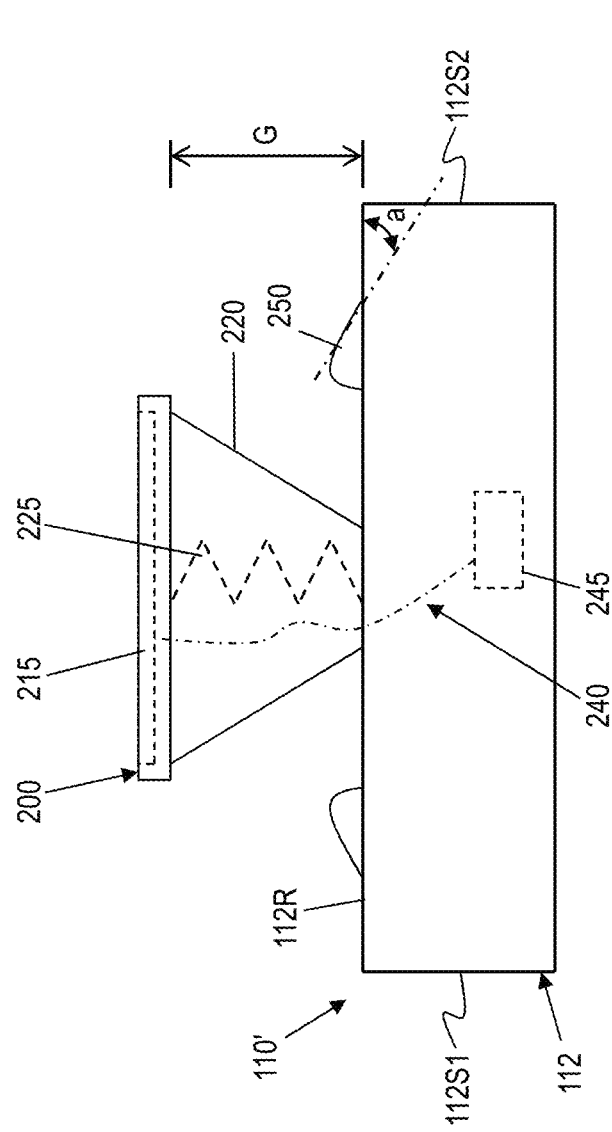

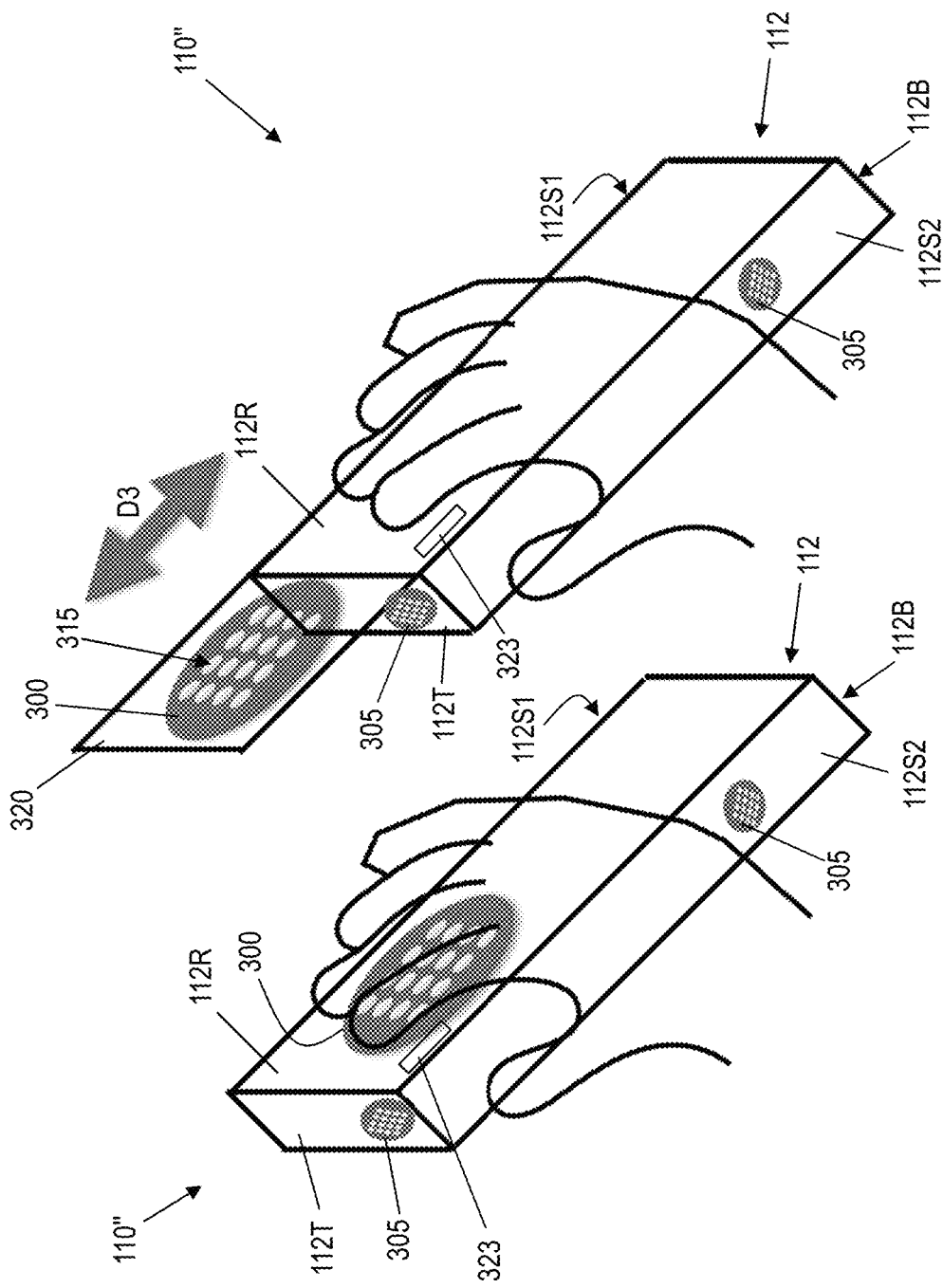

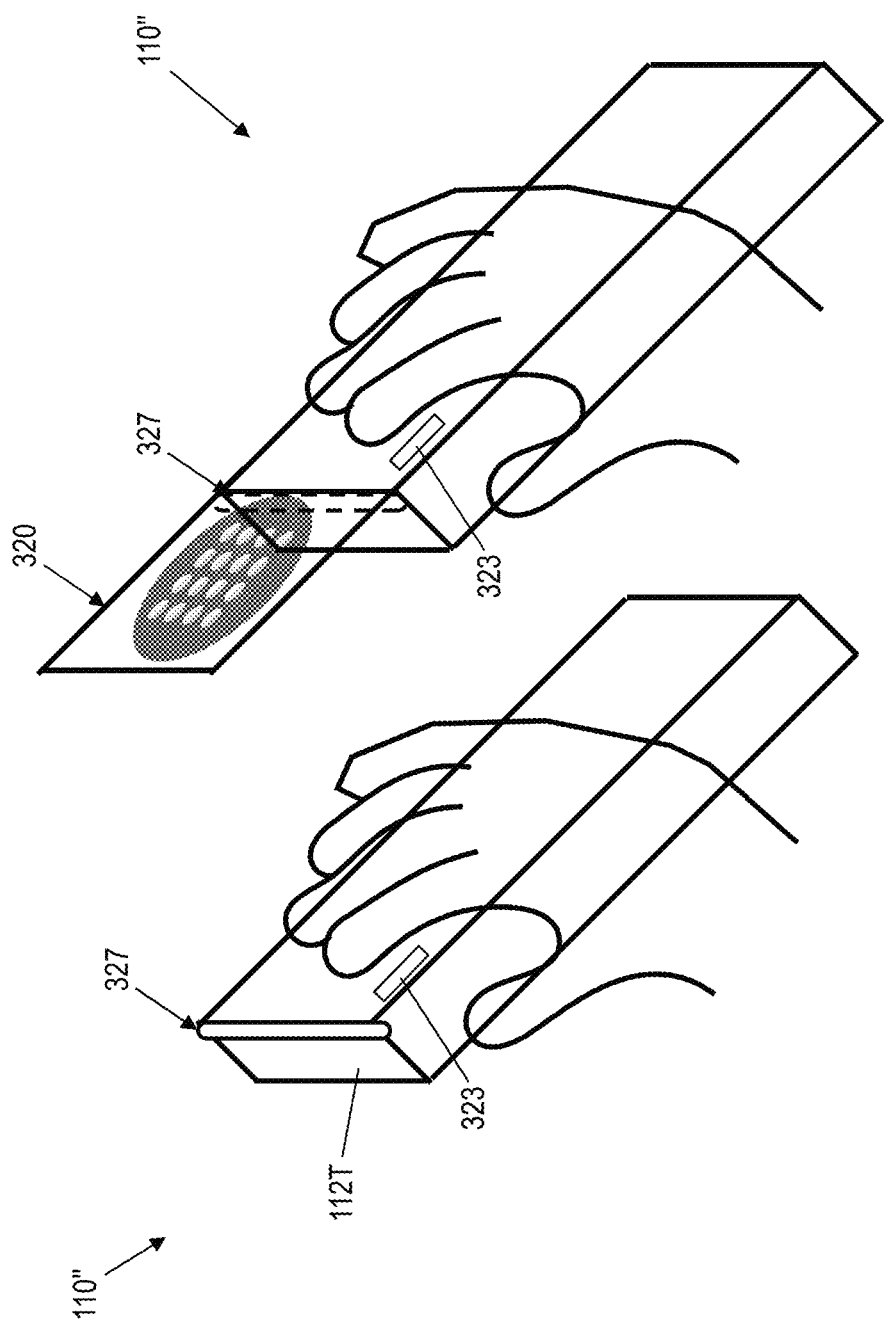

RETRACTABLE PHASED ARRAY FOR MOBILE DEVICES

BACKGROUND

The present invention relates generally to wireless communication systems and, more particularly, to a retractable phased array antenna system for use with mobile devices.

Phase shifters are a component of phased array antenna systems which are used to directionally steer radio frequency (RF) beams for electronic communications or radar. A phased array antenna is a group of antennas in which the relative phases of the respective signals feeding the antennas are varied in such a way that the effective radiation pattern of the array is reinforced in a desired direction and suppressed in undesired directions. The relative amplitudes of, and constructive and destructive interference effects among, the signals radiated by the individual antennas determine the effective radiation pattern of the array. By controlling the radiation pattern through the constructive and destructive superposition of signals from the different antennas in the array, phased array antennas electronically steer the directionality of the antenna system, referred to as beam forming or beam steering. In such systems, the direction of the radiation (i.e., the beam) can be changed by manipulating the phase of the signal fed into each individual antenna of the array, e.g., using a phase shifter.

Generally speaking, a phased array antenna can be characterized as an active beam steering system. Active beam steering systems have actively tunable phase shifters at each individual antenna element to dynamically change the relative phase among the elements and, thus, are capable of changing the direction of the beam plural times. Tunable transmission line (t-line) phase shifters are one way of implementing such actively tunable phase shifters. Tunable t-line phase shifters typically employ powered elements, such as switches, that change the state of an element within the phase shifter to change the phase of the signal that is passing through the phase shifter.

SUMMARY

In a first aspect of the invention, there is an electronic device comprising: a housing; a display; and an extendable phased array antenna structure integrated with the housing and moveable relative to the housing between a retracted position and an extended position. The extendable phased array antenna structure comprises an array of antenna elements that are configured to form a beam in a determined direction.

In another aspect of the invention, there is a method of using the electronic device, the method comprising: determining whether the extendable phased array antenna structure is in an extended position or a retracted position; and based on the determining, performing one of: (i) when the extendable phased array antenna structure is in the extended position, determining an array on the extendable phased array antenna structure with a best signal to an external device, and using the determined array on the extendable phased array antenna structure to communicate with an external device; and (ii) when the extendable phased array antenna structure is in the retracted position, determining an array on the electronic device with a best signal to an external device, and using the determined array on the electronic device to communicate with the external device.

BRIEF DESCRIPTION OF THE DRAWINGS

The present invention is described in the detailed description which follows, in reference to the noted plurality of drawings by way of non-limiting examples of exemplary embodiments of the present invention.

FIGS. 5A, 5B, and 5C show an exemplary mobile device that may be used with embodiments of the invention.

FIGS. 7A and 7B show an implementation of the device of FIGS. 6A and 6B in accordance with aspects of the invention.

FIGS. 8A and 8B show an implementation of the device of FIGS. 6A and 6B in accordance with aspects of the invention.

FIGS. 10A and 10B show a device in accordance with aspects of the invention.

FIGS. 10C and 10D show a device in accordance with aspects of the invention.

DETAILED DESCRIPTION

The present invention relates generally to wireless communication systems and, more particularly, to a retractable phased array antenna system for use with mobile devices. According to aspects of the invention, a mobile electronic device includes a housing, a display, and an extendable phased array antenna structure integrated with the housing and moveable relative to the housing between a retracted position and an extended position. The extendable phased array antenna structure comprises an array of antenna elements that are configured to form a beam in a determined direction.

Beam steering advantageously increases the signal to noise ratio (SNR) of the antenna system up to an order of magnitude or more compared to antenna systems that do not employ beam steering. An increased SNR reduces the amount of power used by the antenna system to transmit the radiation to a receiving antenna, and also permits a higher bandwidth in communication. As a result, beam steering systems have become a focus of the next-generation wireless communication systems including 5G. For example, it is envisioned that 5G systems will utilize fixed-location base stations (e.g., antennas) that steer beams toward users' wireless devices (e.g., smartphones, etc.) on an as-needed basis.

Phased array communication systems for 5G mobile devices operate at frequencies such as between 27 GHz and 90 GHz, with 28 GHz being one specific example. However, there is a significant impact in communication performance when a user's hand that holds a mobile device physically covers (e.g., obstructs) the phased array antenna array of the mobile device. In particular, the effective loss of antenna elements that are covered by a user's hand(s) leads to a lessening of performance of the phased-array antenna system in the form of reduced beam-steering accuracy and decreased signal-to-noise ratio. It may also be desirable by some users to direct radiation away from the head and body, e.g., for health concerns.

Aspects of the invention address these issues by providing an extendable and retractable phased array antenna system that puts the phased-array antenna on the other side of the hand and away from the user's head/body, which allows for improved communication performance and minimizes possible health risks from electromagnetic antenna radiation. In embodiments, the entire radiating array of antennas (in some embodiments including the assembly of phase shifters) is extended away from the mobile device in such a way as to allow the hand to slide easily under the array, which provides the benefit of allowing antenna signals to be free from obstruction by the user's hand while simultaneously radiating more away from the user's body. In embodiments, the retractable array still allows a small phone-sized form factor for easy placement in pockets, while allowing maximum bandwidth to users with minimum radiation to body parts.

Figure 1:
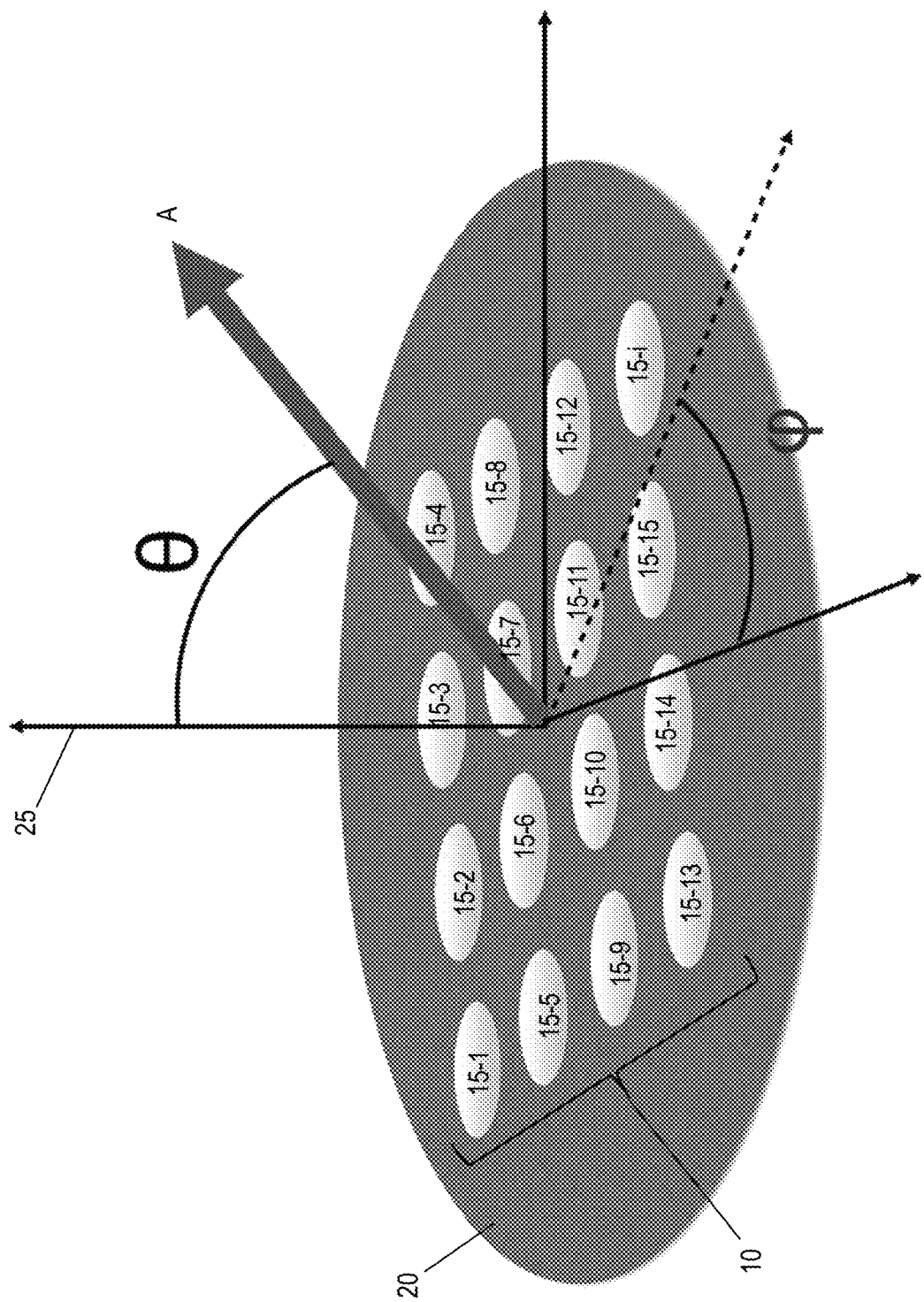
FIG. 1 shows an exemplary phased array antenna system in accordance with aspects of the invention.

FIG. 1 shows an exemplary phased array antenna system in accordance with aspects of the invention. In the example shown in FIG. 1, the phased array antenna system 10 comprises a 4×4 array of antenna elements 15-1, 15-2, . . . , 15-$i$ included in a coin-shaped sensor 20. In this example "i" equals sixteen; however, the number of antenna elements shown in FIG. 1 is not intended to be limiting, and the phased array antenna system 10 may have a different number of antenna elements. Similarly, the implementation in the coin-shaped sensor 20 is only for illustrative purposes, and the phased array antenna system 10 may be implemented in different structures.

Still referring to FIG. 1, the arrow A represents a direction of the beam that is formed by the phased array antenna system 10 using constructive and destructive superposition of signals from the antenna elements 15-1, 15-2, . . . , 15-$i$ using beam steering principles. Angle θ represents the polar angle and angle φ represents the azimuth angle of the direction of the arrow A relative to a frame of reference 25 defined with respect to the phased array antenna system 10.

Figure 2:
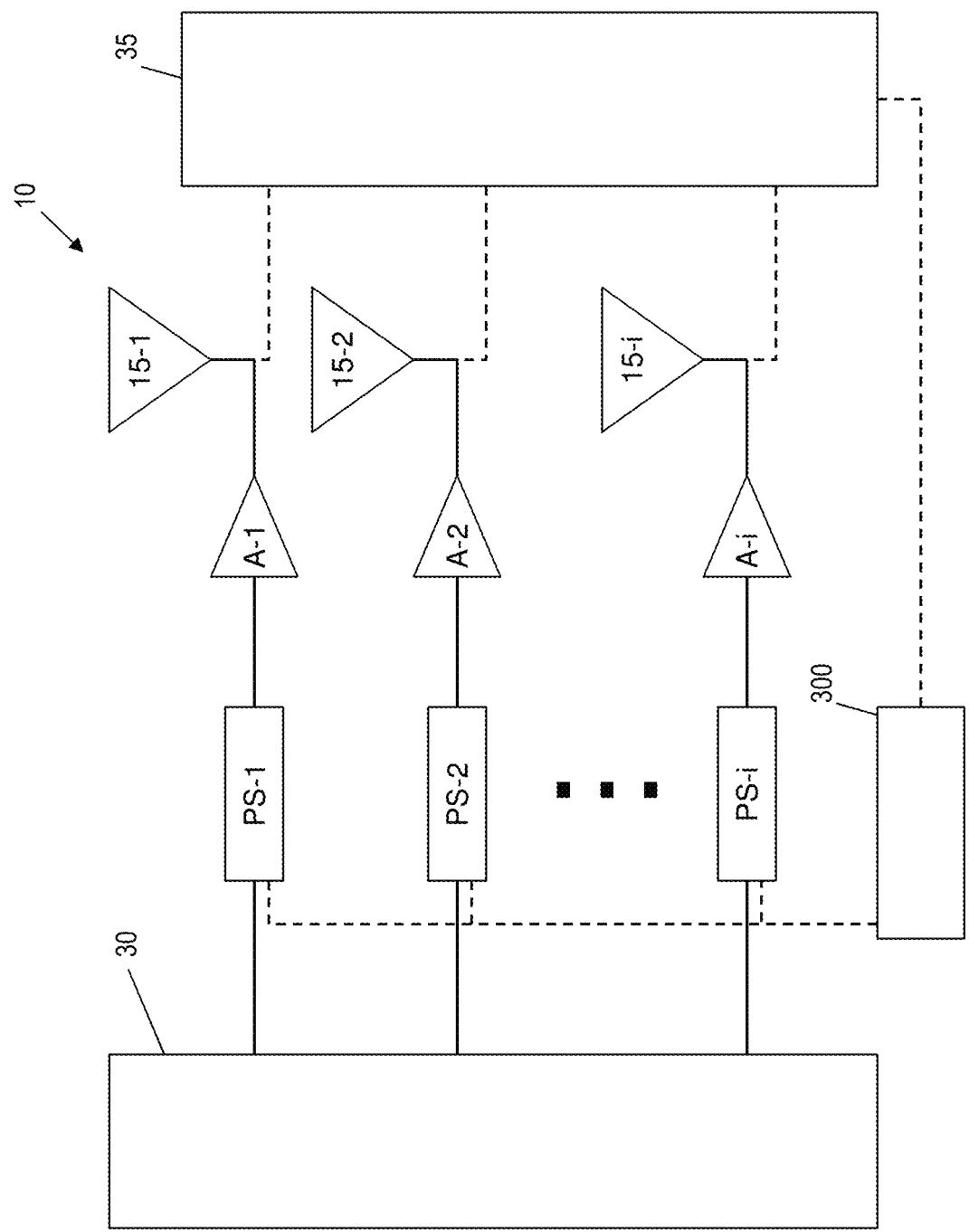
FIG. 2 shows a block diagram of an arrangement of components within the phased array antenna system.

FIG. 2 shows a block diagram of an arrangement of components within the phased array antenna system 10 in accordance with aspects of the invention. In embodiments, a respective phase shifter PS-1, PS-2, . . . , PS-$i$ and amplifier A-1, A-2, . . . , A-$i$ are connected to each respective one of the antenna elements 15-1, 15-2, . . . , 15-$i$. In particular embodiments, the respective phase shifter PS-1, PS-2, . . . , PS-$i$ and amplifier A-1, A-2, . . . , A-$i$ are connected in series upstream of the respective one of the antenna elements 15-1, 15-2, . . . , 15-$i$ as shown in FIG. 2. In implementations, a respective transmission signal is provided to each of the phase shifters PS-1, PS-2, . . . , PS-$i$, e.g., from a power splitter 30 such as a Wilkinson power divider. A respective phase shifter (e.g., PS-$i$) shifts the phase by a predefined amount, the amplifier (A-$i$) amplifies the phase shifted signal, and the antenna element (15-$i$) transmits the amplified and phase shifted signal.

Figure 3:
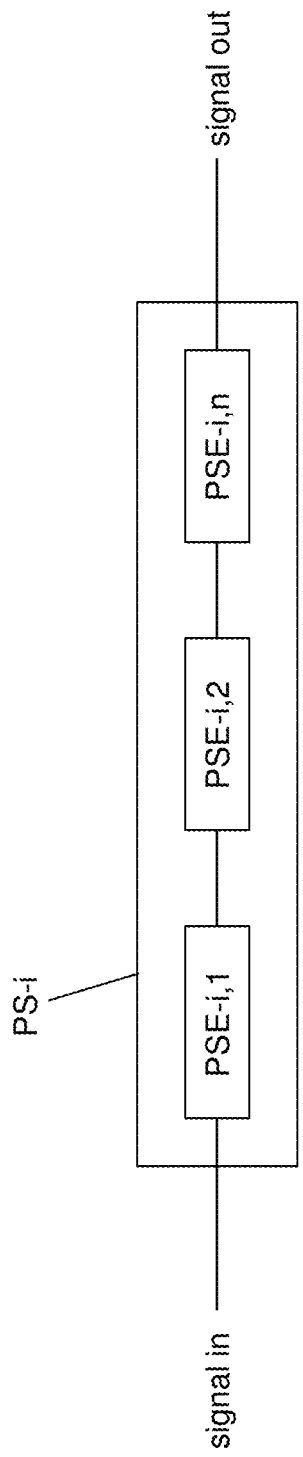
FIG. 3 shows a block diagram of an arrangement of phase shifter elements within a respective one of the phase shifters.

FIG. 3 shows a block diagram of an arrangement of phase shifter elements PSE-i,1, PSE-i,2, . . . , PSE-i,n within a respective one of the phase shifters PS-i in accordance with aspects of the invention. In embodiments, the phase shifter elements PSE-i,1, PSE-i,2, . . . , PSE-i,n are electrically connected in series in the phase shifter PS-i as depicted in FIG. 3. The number "n" of phase shifter elements may be any desired number. In a particular embodiment n=14; however, other numbers of phase shifter elements may be used in implementations of the invention. According to aspects of the invention, each one of the phase shifter elements PSE-i,1, PSE-i,2, . . . , PSE-i,n comprises a respective transmission line (t-line) structure as described with respect to FIG. 4.

Figure 4:
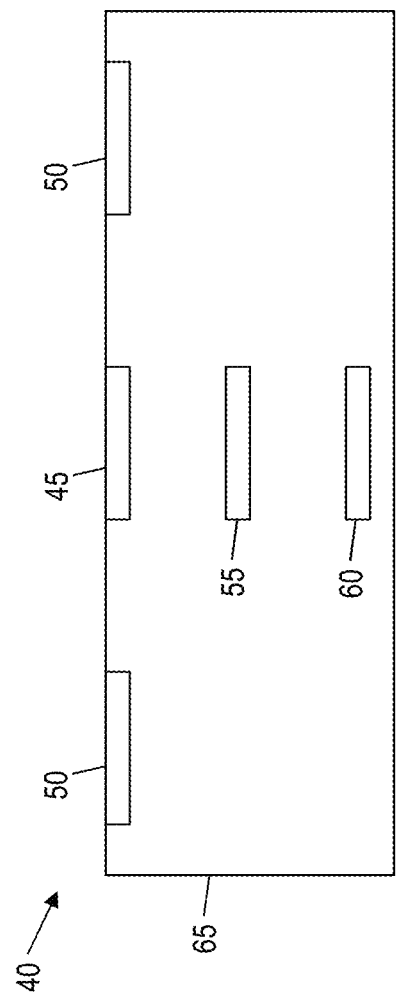
FIG. 4 shows a diagram of a cross section of a transmission line structure of a representative one of the phase shifter elements.

FIG. 4 shows a diagram of a cross section of a transmission line structure 40 of a representative one of the phase shifter elements PSE-i,n in accordance with aspects of the invention. The transmission line structure 40 may be formed in a chip or substrate. The chip may be a monolithic crystal or semiconductor-on-insulator substrate having the transmission line structure 40 formed thereon, or may be a multi-layer printed circuit board. In embodiments, the transmission line structure 40 comprises a signal line 45, at least one ground return line 50, a capacitance line 55, and an inductance return line 60.

In the example shown in FIG. 4, the transmission line structure 40 is in the form of a coplanar waveguide (CPW) structure with the signal line 45 and two ground return lines 50 formed in a same level and running parallel to one another. In this example, the capacitance line 55 comprises capacitance crossing lines that are below the signal line 45 and that cross orthogonally to the signal line 45. The capacitance line 55 does not significantly affect the signal inductance since it is primarily orthogonal to the signal line 45. In this example, the inductance return line 60 is below the capacitance line 55, runs parallel to the signal line 45, and provides inductance control for the transmission line structure 40. The lines 45, 50, 55, 60 are composed of metal or other electrical conductor material formed in one or more layers of dielectric material 65, e.g., in a layered semiconductor structure or a printed circuit board. It is noted that the depicted arrangement of the transmission line structure 40 is merely for illustration; implementations of the invention are not limited to this particular arrangement, and other arrangements of a transmission line structure may be used in embodiments.

Each one of the phase shifter elements PSE-i,n in a single phase shifter PS-i can be controlled to provide a delay state, i.e., to impart a predefined phase shift on the signal passing through the phase shifter elements. In this manner, each one of the phase shifters PS-1, PS-2, . . . , PS-i can be individually configured, by appropriately controlling its phase shifter elements PSE-i,1, PSE-i,2, . . . , PSE-i,n, to achieve a desired phase shift for the signal that is provided to its associated antenna element, such that the combination of signals emitted by the respective antenna elements 15-1, 15-2, . . . , 15-$i$ forms a beam in a desired direction A as shown in FIG. 1. As described herein, the desired direction A may be determined based on signals received from an external device.

With continued reference to FIG. 2, a control circuit 35 is configured to determine a desired direction for the beam emitted by the phased array antenna system 10, and to control the elements of the phased array antenna system 10 to form the beam in the determined desired direction. In operation, based on external signals (e.g., incoming radiation) received by the antenna elements antenna elements 15-1, 15-2, . . . , 15-$i$, the control circuit 35 automatically determines a desired direction of the phased array antenna system 10 as defined by particular a combination of values of angles θ and φ. Based on determining the desired direction of the phased array antenna system 10, the control circuit 65 controls the phase shifters PS-1, PS-2, . . . , PS-i such that the combination of signals emitted by the respective antenna elements 15-1, 15-2, . . . , 15-i forms a beam (e.g., outgoing radiation) in the desired direction. Such automatic determination of a direction of a phased array antenna system is sometimes referred to as "self-installation" and/or "tracking" and is described, for example, in United States Patent Application Publication No. 2019/0089434, published Mar. 21, 2019, the contents of which are expressly incorporated by reference herein in their entirety.

FIGS. 2-4 show one exemplary system that may be used as a phased array antenna system 10 in accordance with aspects of the invention. Implementations of the invention are not limited to what is shown in FIGS. 2-4, however, and other conventional or later-developed active beam steering systems may be used in embodiments.

FIGS. 5A, 5B, and 5C show an exemplary mobile electronic device 110 (also referred to as device 110) that may be used with embodiments of the invention. FIG. 5A is a front view of device 110. FIG. 5B is a side view of device 110. FIG. 5C is a rear view of device 110. Device 110 as shown in FIGS. 5A-C is representative of a smartphone or tablet computing device, although implementations of the invention are not limited to use with these particular examples and instead may be used with other types of handheld mobile electronic devices that utilize wireless communication.

As shown in FIGS. 5A-C, device 110 includes a housing 112. Housing 112 may be formed of plastic, glass, ceramics, fiber composites, metal (e.g., stainless steel, aluminum, etc.), other suitable materials, or a combination of these materials. In some situations, parts of housing 112 may be formed from dielectric or other low-conductivity material (e.g., glass, ceramic, plastic, sapphire, etc.). In other situations, housing 112 or at least some of the structures that make up housing 112 may be formed from metal elements. In embodiments, the housing 112 is integrated with device 110, e.g., as opposed to optional covers that may be selectively connected onto and around device 110 for providing additional protection and/or aesthetic qualities to device 110.

In embodiments, the housing 112 comprises outer surfaces including: a rear housing wall 112R; a first side housing wall 112S1; a second side housing wall 112S2; a top side housing wall 112T; and a bottom side housing wall 112B. In one example, the rear housing wall 112R is a substantially planar surface that is at the rear face of device 110 opposing the front face of device 110.

Device 110 may, if desired, have a display such as display 106. Display 106 may be mounted on the front face of device 110 (i.e., the face of device 110 opposing the rear face of device 110). Display 106 may be a touch screen that incorporates capacitive touch electrodes or may be insensitive to touch.

In embodiments, device 110 includes one or more speakers that emit audio output in a conventional manner. In embodiments, device 110 includes one or more microphones that receive audio input and convert the audio input to electrical signals in a conventional manner. In this manner, device 110 may be employed as a telephone device to conduct telephone calls in which a user's voice is received by the one or more microphones, and in which the audio of the call is emitted via the one or more speakers.

Device 110 may include one or more cameras, one or more physical buttons (e.g., one or more of a home button, volume buttons, keypad, etc.), and one or more batteries (e.g., one or more rechargeable batteries), all of which are understood in the art such that further explanation is not necessary.

In embodiments, device 110 includes control circuitry and input-output circuitry. The control circuitry may include storage circuitry such as hard disk drive storage, nonvolatile memory (e.g., flash memory or other electrically-programmable-read-only memory configured to form a solid-state drive), volatile memory (e.g., static or dynamic random-access-memory), etc. Processing circuitry in the control circuitry may be used to control the operation of device. This processing circuitry may be based on one or more microprocessors, microcontrollers, digital signal processors, baseband processor integrated circuits, application specific integrated circuits, etc. The control circuitry may be used to run software on device 110 such as internet browsing applications, voice-over-internet-protocol (VOIP) telephone call applications, email applications, media playback applications, operating system functions, etc.

The input-output circuitry of device 110 may include input-output circuitry and wireless circuitry as described, for example, in United States Patent Application Publication No. 2020/0106192, published Apr. 2, 2020, the contents of which are expressly incorporated by reference herein in their entirety.

Input-output circuitry may include wireless communications circuitry such as wireless circuitry for communicating wirelessly with external equipment. Wireless circuitry may include radio-frequency (RF) transceiver circuitry formed from one or more integrated circuits, power amplifier circuitry, low-noise input amplifiers, passive RF components, one or more antennas, transmission lines, and other circuitry for handling RF wireless signals.

Wireless circuitry may include radio-frequency transceiver circuitry for handling various radio-frequency communications bands. For example, transceiver circuitry may include Global Positioning System (GPS) receiver circuits, local wireless transceiver circuits (e.g. for wireless local area network (WLAN), Wi-Fi, Bluetooth, etc.), remote wireless transceiver circuits (e.g., cellular telephone transceiver circuitry), and/or millimeter wave transceiver circuits (e.g., extremely high frequency (EHF) transceiver circuitry that supports communications at frequencies between about 10 GHz and 300 GHz).

Antennas in the wireless circuitry may be formed using any suitable antenna types. Different types of antennas may be used for different bands and combinations of bands. For example, one type of antenna may be used in forming a local wireless link antenna and another type of antenna may be used in forming a remote wireless link antenna.

Transmission line paths may be used to route antenna signals within device 110. For example, transmission line paths may be used to couple antennas to transceiver circuitry. Transmission line paths in device 110 may include coaxial cable paths, microstrip transmission lines, stripline transmission lines, edge-coupled microstrip transmission lines, edge-coupled stripline transmission lines, waveguide structures for conveying signals at millimeter wave frequencies (e.g., coplanar waveguides or grounded coplanar waveguides), transmission lines formed from combinations of transmission lines of these types, etc. One or more transmission line paths in device 110 may take the form of transmission line structure 40 shown in FIG. 4.

Transmission line paths in device 110 may be integrated into rigid and/or flexible printed circuit boards if desired. In one suitable arrangement, transmission line paths in device 110 may include transmission line conductors (e.g., signal and/or ground conductors) that are integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive). Filter circuitry, switching circuitry, impedance matching circuitry, and other circuitry may be interposed within the transmission lines, if desired.

Device 110 may contain multiple antennas. The antennas may be used together or one of the antennas may be switched into use while other antenna(s) are switched out of use. If desired, the control circuitry may be used to select an optimum antenna to use in device 110 in real time and/or to select an optimum setting for adjustable wireless circuitry associated with one or more of antennas. Antenna adjustments may be made to tune antennas to perform in desired frequency ranges, to perform beam steering with a phased antenna array, and to otherwise optimize antenna performance. Sensors may be incorporated into antennas to gather sensor data in real time that is used in adjusting antennas if desired.

In embodiments, the antennas in device 110 include at least one phased array, such as phased array antenna system 10 described with respect to FIG. 1, configured to implement beam steering functions. For example, the antennas that are used in handling millimeter wave signals for millimeter wave transceiver circuitry may be implemented as one or more phased array antenna systems. The radiating elements (e.g., antenna elements 15-1, 15-2, . . . , 15-$i$) in a phased array antenna system for supporting millimeter wave communications may be patch antennas, dipole antennas, Yagi (Yagi-Uda) antennas, or other suitable antenna elements. Millimeter wave transceiver circuitry can be integrated with the phased array antenna systems to form integrated phased array antenna systems and transceiver circuit modules or packages (sometimes referred to herein as integrated antenna modules or antenna modules) if desired.

Figure 6B:
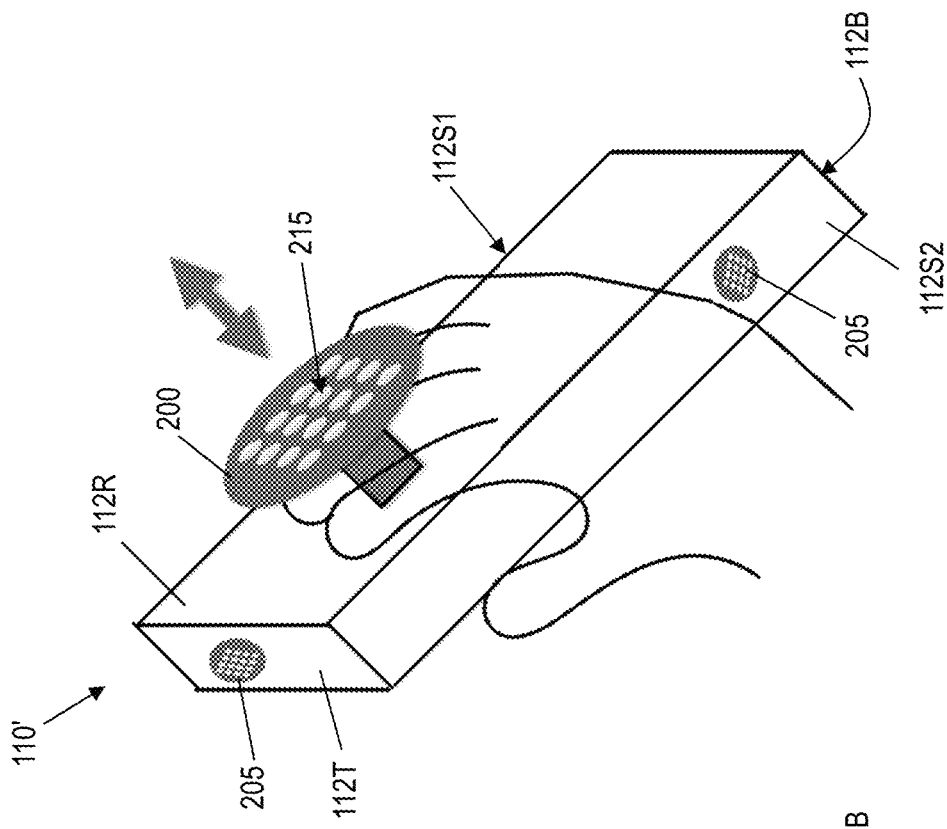
FIGS. 6A and 6B show a device in accordance with aspects of the invention.
Figure 6A:
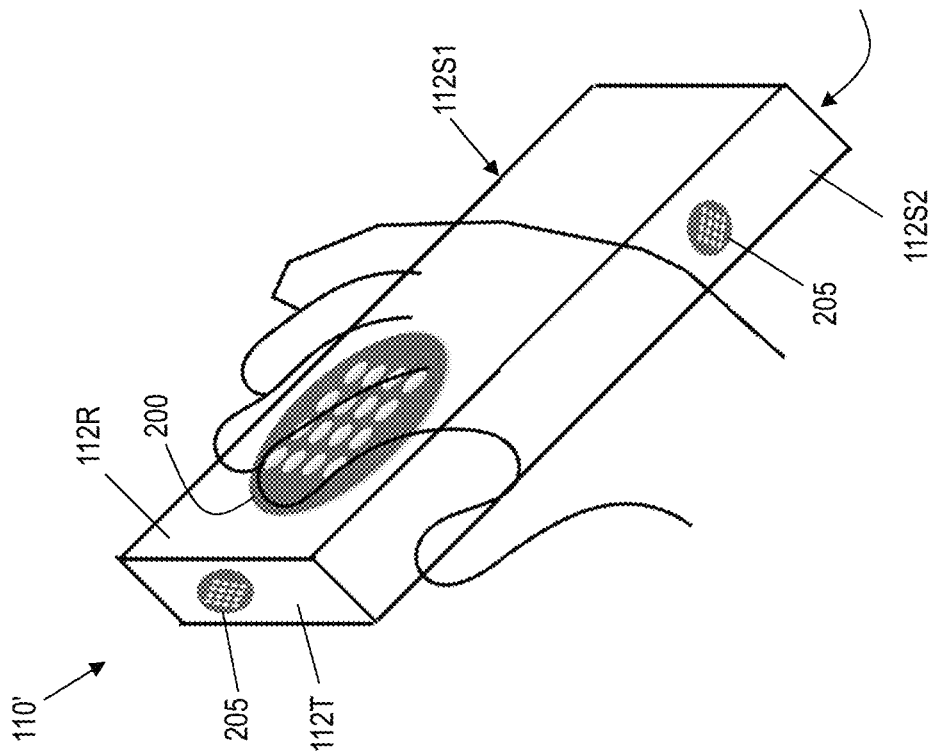

FIGS. 6A and 6B show an embodiment of device 110' in accordance with aspects of the invention. In embodiments, device 110' is similar to device 110 except in aspects described differently herein. As shown in FIGS. 6A and 6B, device 110' includes a selectively extendable and retractable phased array antenna structure 200 integrated with the housing 112 of device 110' at the rear housing wall 112R. In embodiments, the antenna structure 200 includes antenna elements 215 (e.g., antenna elements 15-1, 15-2, . . . , 15-$i$) of a phased array antenna system (e.g., phased array antenna system 10) that may be used for wireless communication (e.g., 5G) between device 110' and other devices. In embodiments, the antenna structure 200 includes a material (e.g., one or more of plastic, metal, composite, etc.) that houses the antenna elements 215 and their associated circuitry.

As used herein, an antenna structure is integrated with the housing 112 when the antenna structure cannot be disconnected from the housing 112 without either physically damaging (e.g., breaking) the device or disassembling the device. The extendable antenna structures of embodiments of the invention may be integrated with the housing 112 by, for example, making one or more parts of the extendable antenna structure a part of the housing itself, or by confining one or more parts of the extendable antenna structure within a portion of the housing.

In accordance with aspects of the invention, the antenna elements 215 face outward from the antenna structure 200, e.g., in a direction away from device 110'. As shown in FIG. 6B, when the antenna structure 200 is extended outward from the rear housing wall 112R, a user may hold device 110' with their hand in a space formed between the rear housing wall 112R and the antenna structure 200, such that the user's hand that is positioned in this manner does not cover the antenna elements 215. In this manner, the user's hand that is holding device 110' does not block millimeter wave signals that are transmitted and/or received by the antenna elements 215. This is advantageous because it avoids attenuation of the millimeter wave signals (including 5G signals) that can occur when a user's hand covers (e.g., physically obstructs) the antenna elements of an extremely high frequency antenna.

Still referring to FIGS. 6A and 6B, in embodiments, device 110' has additional phased array antenna arrays 205 that are not on the antenna structure 200, but instead are on one or more of the peripheral sides including the first side housing wall 112S1, the second side housing wall 112S2, the top side housing wall 112T, and the bottom side housing wall 112B. Each of the arrays 205 includes plural phased array antenna elements (e.g., antenna elements 15-1, 15-2, . . . , 15-$i$) of a phased array antenna system (e.g., phased array antenna system 10). In embodiments, each of the arrays 205 and the antenna structure 200 are electrically connected to the control circuitry of device 110' and are configured for supporting millimeter wave communications including 5G. In embodiments, each of the arrays 205 and the antenna structure 200 are controlled by the control circuitry of device 110' independently of one another. With this type of arrangement, an unblocked one of arrays 205 or antenna structure 200 may be switched into use and, once switched into use, the phased array antenna may use beam steering to optimize wireless performance. Similarly, if one of arrays 205 or antenna structure 200 does not face or have a line of sight to an external device, then another one of arrays 205 or antenna structure 200 that has line of sight to the external device may be switched into use and that phased array antenna may use beam steering to optimize wireless performance. Configurations in which antennas from one or more different locations in the device are operated together may also be used.

In an exemplary embodiment, the antenna structure 200 is a disc having a substantially circular shape with a diameter of about 0.7 inches to 1.5 inches, and a thickness "t" of about 0.1 to 0.2 inches. Implementations are not limited to this exemplary size and shape, and different sizes and/or shapes may be used. The antenna structure 200 may contain any suitable number of antenna elements 215, the elements having any desired size and shape and being arranged in any desired pattern on the antenna structure 200.

FIGS. 7A and 7B illustrate an exemplary implementation of the selectively extendable and retractable phased array antenna structure 200 integrated with the housing 112 of device 110' at the rear housing wall 112R. FIG. 7A shows a diagrammatic cross section of device 110' with the antenna structure 200 in a retracted position. FIG. 7B shows a diagrammatic cross section of device 110' with the antenna structure 200 in an extended position.

According to aspects of the invention, an extendable structure 220 connects the antenna structure 200 to the housing 112. In one exemplary embodiment, the extendable structure 220 is an accordion that includes a folding section comprising a series of relatively rigid walls interspersed with flexural (or "living") hinges, which flex as the accordion is collapsed or expanded. Flexing of the hinges allows the walls to fold up in a generally parallel configuration next to one another, rather than stacking on top of one another, when the extendable structure 220 is in the collapsed (also referred to retracted) position. This reduces the profile of the extendable structure 220 in the collapsed position. Other extendable structures may be used, such as a telescoping structure, for example.

In accordance with aspects of the invention, the extendable structure 220 is sized such that there is a gap G of a size sufficient to accommodate the fingers of a user holding device 110' (e.g., as illustrated in FIG. 6B). In embodiments, the gap G has a value in a range between 0.5 inches and 0.8 inches, although other values may be used to accommodate different finger sizes.

As shown in FIG. 7A, in this embodiment, the outer surface of the antenna structure 200 is substantially flush with the outer surface of the rear housing wall 112R when the antenna structure 200 is in the retracted position. As used herein, the outer surface of the antenna structure 200 is substantially flush with the outer surface of the rear housing wall 112R when one of the following conditions is satisfied: (i) the outer surface of the antenna structure 200 is co-planar with the outer surface of the rear housing wall 112R; (ii) the outer surface of the antenna structure 200 is recessed below (e.g., inward toward the front face of device 110') the outer surface of the rear housing wall 112R; and (iii) the outer surface of the antenna structure 200 extends outward from the outer surface of the rear housing wall 112R (e.g., in a direction away from the front face) no more than 1 millimeter. By making the outer surface of the antenna structure 200 substantially flush with the outer surface of the rear housing wall 112R when the antenna structure 200 is in the retracted position, this embodiment of the invention advantageously preserves the slim form factor of device 110' to facilitate a user sliding device 110' into and out of their pocket without the antenna structure 200 being a snag hazard.

In an embodiment, the antenna structure 200 is biased toward the extended position (e.g., FIG. 7B) by a spring 225 or similar biasing element. In this embodiment, the antenna structure 200 includes a latch mechanism that selectively engages the housing 112 when the antenna structure 200 is in the retracted position (e.g., FIG. 7A), and that the user can selectively cause to disengage from the housing 112 to cause the antenna structure 200 to move outward to the extended position under the force of the spring 225.

In embodiments, the latch mechanism comprises a push-latch that releases when the antenna structure 200 is in the retracted position and the user pushes the antenna structure 200 inward toward device 110', and that latches when the antenna structure 200 is in the extended position and the user pushes the antenna structure 200 to the retracted position. In this manner, when the antenna structure 200 is in the retracted position, the user may move the antenna structure 200 to the extended position by pushing inward on the antenna structure 200 (e.g., in the direction indicated by arrow D1), which action releases the latch mechanism and thereby permits the spring 225 to move the antenna structure 200 to the extended position (e.g., by moving in the direction indicated by arrow D2). Conversely, when the antenna structure 200 is in the extended position, the user may move the antenna structure 200 to the retracted position by pushing inward on the antenna structure 200 (in direction D1), which overcomes the force of the spring 225 and moves the antenna structure 200 into a cavity 210 in the housing 112, at which point the latch mechanism engages and keeps the antenna structure 200 in the retracted position until the next time the user presses on the antenna structure 200 to release the antenna structure 200.

In one exemplary implementation, the latch mechanism comprises a catch element 230 on the antenna structure 200 that is biased into an engagement position. In this implementation, the catch element 230 is configured to engage an engagement element 235 on or in the housing 112. The engagement element 235 may comprise a divot, a shoulder, etc. In this implementation, the catch element 230 is engaged with the engagement element 235 when the antenna structure 200 is in the retracted position. In this implementation, the latch mechanism is configured such that, when the catch element 230 is engaged with the engagement element 235 in this position, movement of the antenna structure 200 inward relative to the rear face (e.g., in direction D1 toward the front face of device 110') causes the catch element 230 to momentarily disengage from the engagement element 235, which permits the spring 225 to push the antenna structure 200 outward (e.g., in the direction D2) to the extended position when the user releases the pushing force. In this implementation, the latch mechanism is configured such that the catch element 230 extends back to its engagement position a time after the catch element 230 is momentarily disengaged from the engagement element 235, such that the catch element 230 will again engage the engagement element 235 when the antenna structure 200 is pushed from the extended position to the retracted position. Implementations are not limited to a single catch element 230 and engagement element 235, and instead plural catch elements 230 may be used with plural corresponding engagement elements 235. Implementations of the invention also are not limited to any particular latch mechanism, and any conventional or later-developed latch mechanism that operates to momentarily disengage the latch mechanism upon input from a user may be used. Moreover, the latch mechanism may be located at any suitable location on device 110'.

Still referring to FIGS. 7A and 7B, in accordance with aspects of the invention, a flexible transmission line 240 connects the antenna elements 215 to control circuitry 245 of device 110'. The flexible transmission line 240 may be a flexible microstrip transmission line, or other flexible high speed transmission line that is suitable for use with antennas that operate at frequencies between about 10 GHz and 300 GHz (including 5G antennas). In embodiments, as shown in FIG. 7A, the flexible transmission line 240 has sufficient flexibility to fold up when the antenna structure 200 is in the retracted position. In embodiments, as shown in FIG. 7B, the flexible transmission line 240 has sufficient length to extend between the control circuitry 245 and the antenna elements 215 when the antenna structure 200 is in the extended position. In embodiments, the flexible transmission line 240 extends through a cavity formed inside the extendable structure 220, such that the flexible transmission line 240 is hidden from view and protected.

With continued reference to FIGS. 7A and 7B, in a passive embodiment, the antenna structure 200 includes only passive antenna components, such as antenna elements 215 and transmission circuitry. In this passive embodiment, the active components of the antenna system (e.g., the phase shifters PS-1, PS-2, . . . , PS-i and amplifiers A-1, A-2, . . . , A-i) are contained in the control circuitry 245 inside device 110'. Alternatively, in an active embodiment, the antenna structure 200 includes both passive and active antenna components, such that the as antenna elements 215, phase shifters, and amplifiers are all housed in the antenna structure 200.

Also, shown in FIG. 7A, device 110' may include a switch that is used to determine when the antenna structure 200 is extended and retracted. In one exemplary embodiment, a first switch component 232a is on or in the antenna structure 200 and a second switch element 232b is on or in the housing 112. The second switch element 232b is electrically connected to the control circuitry of device 110'. The switch components 232a, 232b are located such that they contact one another when the antenna structure 200 is in the retracted position, and do not contact each other when the antenna structure 200 in the extended position. Based on the contact or lack of contact between the switch components 232a, 232b, the control circuitry determines whether the antenna structure 200 is extended and retracted. Other types of switch may be used to determine when the antenna structure 200 is extended and retracted.

FIGS. 8A and 8B illustrate another exemplary implementation of the selectively extendable and retractable phased array antenna structure 200 integrated with the housing 112 of device 110' at the rear housing wall 112R. FIG. 8A shows a diagrammatic cross section of device 110' with the antenna structure 200 in a retracted position. FIG. 8B shows a diagrammatic cross section of device 110' with the antenna structure 200 in an extended position. The implementation shown in FIGS. 8A and 8B includes an extendable structure 220, spring 225, and flexible transmission line 240 connected between the control circuitry 245 and the antenna elements 215, that all may operate in the same manner as shown in and described with respect to FIGS. 7A and 7B.

As shown in FIG. 8A, in this implementation, a bottom surface of the antenna structure 200 abuts the outer surface of the rear housing wall 112R when the antenna structure 200 is in the retracted position. This avoids the need for a cavity (such as cavity 210) in the housing 112, which frees up space inside the housing 112 for other components of device 110'. In the implementation shown in FIGS. 8A and 8B, the rear housing wall 112R includes at least one sloped surface 250 near the edges of the antenna structure 200. In embodiments, each of the at least one sloped surfaces 250 has a height "h" above the rear housing wall 112R that is substantially the same as that of the antenna structure 200 when the antenna structure 200 is in the retracted position. As used herein, substantially the same height "h" means that the outer surfaces are within about 1 mm of each other in the height direction.

As shown in FIG. 8B, the at least one sloped surface 250 is sloped at an angle "a" relative to a plane defined by the outer surface of the rear housing wall 112R. In embodiments, the angle "a" is between 10° and 80°, and preferably between 20° and 70°, and more preferably between 30° and 60°, and even more preferably between 40° and 50°. The at least one sloped surface 250 reduces the snag potential of the edges of the antenna structure 200, e.g., when device 110' is slid into or out of a pocket. In a particular embodiment, the antenna structure 200 is a substantially circular disc and the at least one sloped surface 250 is a substantially circular sloped surface that surrounds the antenna structure 200. In embodiments, the at least one sloped surface 250 is integrally formed as part of the rear housing wall 112R.

Similar to that described at FIGS. 7A and 7B, the implementation shown in FIGS. 8A and 8B may include a latch mechanism (diagrammatically shown at 227) that selectively engages the housing 112 when the antenna structure 200 is in the retracted position, and that the user can selectively cause to disengage from the housing 112 to cause the antenna structure 200 to move outward to the extended position under the force of the spring 225. In a particular embodiment, the latch mechanism comprises a push-latch that releases when the antenna structure 200 is in the retracted position and the user pushes the antenna structure 200 inward toward device 110', and that latches when the antenna structure 200 is in the extended position and the user pushes the antenna structure 200 to the retracted position. Aspects of the invention are not limited to this exemplary latch mechanism, however, and any suitable latch mechanism may be used in the implementation shown in FIGS. 8A and 8B.

Figure 9A:
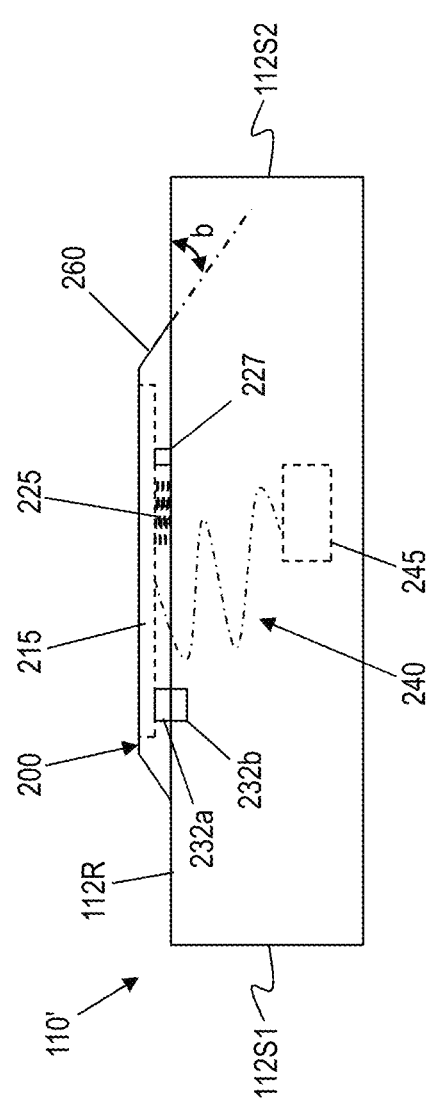
FIGS. 9A and 9B show an implementation of the device of FIGS. 6A and 6B in accordance with aspects of the invention.
Figure 9B:
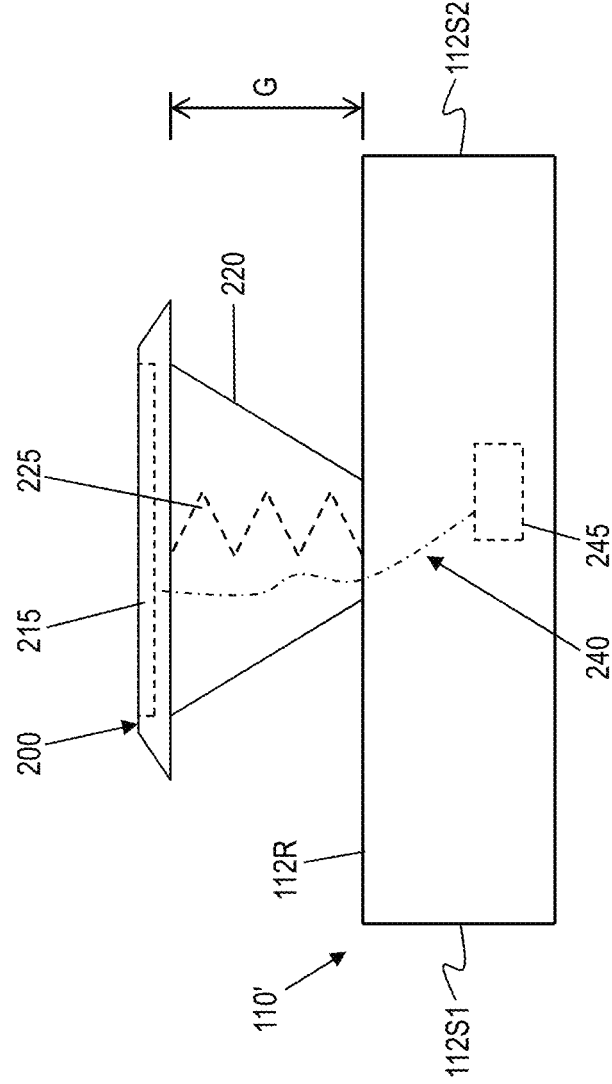

FIGS. 9A and 9B illustrate another exemplary implementation of the selectively extendable and retractable phased array antenna structure 200 integrated with the housing 112 of device 110' at the rear housing wall 112R. FIG. 9A shows a diagrammatic cross section of device 110' with the antenna structure 200 in a retracted position. FIG. 9B shows a diagrammatic cross section of device 110' with the antenna structure 200 in an extended position. The implementation shown in FIGS. 9A and 9B includes an extendable structure 220, spring 225, and flexible transmission line 240 connected between the control circuitry 245 and the antenna elements 215, that all may operate in the same manner as shown in and described with respect to FIGS. 7A and 7B.

The implementation shown in FIGS. 9A and 9B is similar to that shown in FIGS. 8A and 8B except that the implementation shown in FIGS. 9A and 9B has a differently shaped phased array antenna structure 200 and omits the at least one sloped surface 250. In the implementation shown in FIGS. 9A and 9B, the phased array antenna structure 200 has at least one sidewall 260 that is sloped at an angle "b" relative to a plane defined by the outer surface of the rear housing wall 112R. In embodiments, the angle "b" is an acute angle and is between 10° and 80°, and preferably between 20° and 70°, and more preferably between 30° and 60°, and even more preferably between 40° and 50°. The at least one sidewall 260 reduces the snag potential of the edges of the antenna structure 200, e.g., when device 110' is slid into or out of a pocket. In a particular embodiment, the antenna structure 200 is a truncated right circular cone, with the at least one sidewall 260 extending around the entirety of the structure.

Similar to that described at FIGS. 7A and 7B, the implementation shown in FIGS. 9A and 9B may include a latch mechanism (diagrammatically shown at 227) that selectively engages the housing 112 when the antenna structure 200 is in the retracted position, and that the user can selectively cause to disengage from the housing 112 to cause the antenna structure 200 to move outward to the extended position under the force of the spring 225. In a particular embodiment, the latch mechanism comprises a push-latch that releases when the antenna structure 200 is in the retracted position and the user pushes the antenna structure 200 inward toward device 110', and that latches when the antenna structure 200 is in the extended position and the user pushes the antenna structure 200 to the retracted position. Aspects of the invention are not limited to this exemplary latch mechanism, however, and any suitable latch mechanism may be used in the implementation shown in FIGS. 9A and 9B.

Similar to that described at FIGS. 7A and 7B, the implementation shown in FIGS. 8A and 8B and that shown in FIGS. 9A and 9B may be configured in either a passive embodiment (e.g., the antenna structure 200 includes only passive antenna components, such as antenna elements 215 and transmission circuitry) or an active embodiment (e.g., the antenna structure 200 includes both passive and active antenna components).

FIGS. 10A and 10B show another embodiment of device 110" in accordance with aspects of the invention. In embodiments, device 110" is similar to device 110 except in aspects described differently herein. As shown in FIGS. 10A and 10B, device 110" includes a selectively extendable and retractable phased array antenna structure 300 integrated with the housing 112 at the rear housing wall 112R. In embodiments, the antenna structure 300 includes antenna elements 315 (e.g., antenna elements 15-1, 15-2, . . . , 15-*i*) of a phased array antenna system (e.g., phased array antenna system 10) that may be used for wireless communication (e.g., 5G) between device 110" and other devices. In embodiments, the antenna structure 300 includes a material (e.g., one or more of plastic, metal, composite, etc.) that houses the antenna elements 315.

In accordance with aspects of the invention, the antenna elements 315 face outward from device 110", e.g., in a direction outward from and substantially orthogonal to the rear housing wall 112R. As shown in FIG. 10B, when the antenna structure 300 is extended outward from the rear housing wall 112R, a user may hold device 110" with their hand around the rear housing wall 112R, such that the user's hand that is positioned in this manner does not cover the antenna elements 315. In this manner, the user's hand that is holding device 110" does not block millimeter wave signals that are transmitted and/or received by the antenna elements 315. This is advantageous because it avoids attenuation of the millimeter wave signals (including 5G signals) that can occur when a user's hand covers (e.g., physically obstructs) the antenna elements of an extremely high frequency antenna.

Still referring to FIGS. 10A and 10B, in embodiments, device 110" has additional phased array antenna arrays 305 on each of the peripheral sides including the first side housing wall 112S1, the second side housing wall 112S2, the top side housing wall 112T, and the bottom side housing wall 112B. Each of the arrays 305 includes plural phased array antenna elements (e.g., antenna elements 15-1, 15-2, . . . , 15-*i*) of a phased array antenna system (e.g., phased array antenna system 10). In embodiments, each of the arrays 305 and the antenna structure 300 are electrically connected to the control circuitry of device 110" and are configured for supporting millimeter wave communications including 5G. In embodiments, each of the arrays 305 and the antenna structure 300 are controlled by the control circuitry of device 110" independently of one another. With this type of arrangement, an unblocked one of arrays 305 or antenna structure 300 may be switched into use and, once switched into use, the phased array antenna may use beam steering to optimize wireless performance. Similarly, if one of arrays 305 or antenna structure 300 does not face or have a line of sight to an external device, then another one of arrays 305 or antenna structure 300 that has line of sight to the external device may be switched into use and that phased array antenna may use beam steering to optimize wireless performance. Configurations in which antennas from one or more different locations in the device are operated together may also be used.

With continued reference to FIGS. 10A and 10B, in embodiments, the antenna structure 300 is formed on (or in) a slidable structure 320 that is integrally connected to housing 112 and configured for translational movement relative to the housing 112 in the direction indicated by arrow D3. The slidable structure 320 may be connected to the housing 112 in any suitable manner. In one exemplary implementation, the slidable structure 320 comprises an outer surface of device 110" and has first and second side edges that are slidably contained in grooves or slots defined by the housing 112 and that extend parallel to the direction D3 that is substantially parallel to a plane of the rear housing wall 112R and substantially orthogonal to a plane of the top side housing wall 112T. According to aspects of the invention, by forming the slidable structure 320 and the antenna structure 300 as part of the housing 112, implementations of the invention advantageously provide for a small size and shape.

In one exemplary implementation, shown in FIGS. 10C and 10D, the slidable structure 320 is inside device 110" when the slidable structure 320 is in the retracted position (e.g., FIG. 10C). In this embodiment, device 110" comprises an aperture 327 at or near the top side housing wall 112T, and the slidable structure 320 extends outward through the aperture 327 when the slidable structure 320 is moved to the extended position (e.g., FIG. 10D). According to aspects of the invention, by containing the slidable structure 320 and the antenna structure 300 inside the housing 112 when retracted, implementations of the invention advantageously provide for a small size and shape. The embodiment shown in FIGS. 10C and 10D may include additional arrays 305 similar to those shown in FIGS. 10A and 10B.

In an exemplary embodiment, the slidable structure 320 is a blade-like structure embodied as a substantially rectangular shaped component, with or without rounded corners, and having dimensions similar to a common credit card (e.g., a length of about 3.3 inches, a width of about 2.1 inches, and a thickness of about 0.03 inches). The slidable structure 320 may be composed of any suitable material or combination of materials including but not limited to plastic, metal, and composite materials. The slidable structure 320 is not limited to this exemplary embodiment, and other sizes, shapes, and/or materials may be used in implementations of the invention.

In embodiments, a flexible transmission line (e.g., similar to flexible transmission line 240 shown in FIGS. 7A and 7B) connects the antenna elements 315 to the control circuitry of device 110". In this manner, the control circuitry of device 110" maintains an electrical connection with the antenna elements 315 as the slidable structure 320 moves between the extended and retracted positions. Other electrical connections may be used, including that shown in FIGS. 12A and 12B, as but one example.

Similar to that described at FIGS. 7A and 7B, the implementation shown in FIGS. 10A and 10B may be configured in either a passive embodiment (e.g., the antenna structure 300 includes only passive antenna components, such as antenna elements 315 and transmission lines) or an active embodiment (e.g., the antenna structure 300 includes both passive and active antenna components).

In some implementations, the slidable structure 320 is manually moved by the user between the extended and retracted positions. To this end, the slidable structure 320 may include one or more gripping features that facilitate manual movement, e.g., knurling, one or more ridges, etc., that the user can utilize to apply a force to the slidable structure 320 to move the slidable structure 320 into the extended position or the retracted position.

In other implementations, the slidable structure 320 is automatically moved between the extended and retracted positions. In embodiments, device 110" includes an actuator 323 that moves the slidable structure 320 outward to the extended position. The actuator 323 may comprise any conventional or later developed actuator 323 that imparts a force on the slidable structure 320 to cause the slidable structure 320 to translate linearly toward the extended position. Non-limiting examples include a rack and pinion gear and an electromechanical linear actuator.

In one embodiment, the actuator 323 moves the slidable structure 320 in one direction only, e.g., outward from the retracted position toward the extended position. In this embodiment, the user applies a force to manually push the slidable structure 320 from the extended position back to the retracted position. In another embodiment, the actuator 323 is a two-way actuator that is capable of providing a force to move the slidable structure 320 in both directions, e.g., in a first direction from the retracted position toward the extended position, and in a second direction from the extended position to the retracted position. In embodiments, the actuator 323 is powered by the battery of device 110" and controlled by the control circuitry of device 110". In some embodiments, the actuator 323 is actuated based on input from the user. In other embodiments, the actuator 323 is actuated automatically by the control circuitry of device 110" without any input from the user.

In a particular exemplary embodiment, device 110" is configured to automatically extend the slidable structure 320 and/or provide an alert to the user when two conditions are satisfied: (i) the slidable structure 320 is in the retracted position and (ii) the signal strength is less than a predefined threshold. Regarding the first condition, as described herein at FIGS. 12A and 12B, device 110" may include a switch or other mechanism that is used to determine when the antenna structure 320 is in the retracted position or the extended position. Regarding the second condition, the control circuitry determines the current signal strength of device 110" as is understood in the art.

In embodiments, the control circuitry is programmed to compare the current signal strength to a predefined threshold value. When the control circuitry determines the current signal strength is greater than the predefined threshold value, then no additional action is taken as this is indicative of device 110" having sufficient signal strength. On the other hand, when the control circuitry determines the current signal strength is less than the predefined threshold value, then the control circuitry determines whether the slidable structure 320 is in the retracted position. In the event the current signal strength is less than the predefined threshold value and the slidable structure 320 is in the retracted position, then the control circuitry performs one of two actions: (a) the control circuitry controls the actuator 323 to automatically move the slidable structure 320 from the retracted position to the extended position; (b) the control circuitry causes device 110" to output an alert (e.g., audio and/or video and/or haptic) to the user. The alert may suggest, for example, that the user manually move the slidable structure 320 from the retracted position to the extended position, or that the user provide input to device 110" to cause the actuator 323 to move the slidable structure 320 from the retracted position to the extended position.

In accordance with additional aspects of the invention, the control circuitry and/or the actuator 323 may be configured to halt the actuator 323 while moving the slidable structure 320 from the retracted position to the extended position in response to an excessive resistive force opposing the actuator-induced motion of the slidable structure 320 from the retracted position to the extended position. In embodiments, the excessive resistive force is a resistive force that is greater than a predefined threshold value that is programmed to correspond to a force that would be exerted against the slidable structure 320 when the movement of the slidable structure 320 is opposed by a part of the body of the user, such as when device 110" is positioned in such a way that the slidable structure 320 is being pushed against the user's head or hand. In this aspect, when the control circuitry determines that an excessive resistive force is being encountered, the control circuitry controls the actuator 323 to stop moving the slidable structure 320 from the retracted position to the extended position.

Figures 11A, 11B:
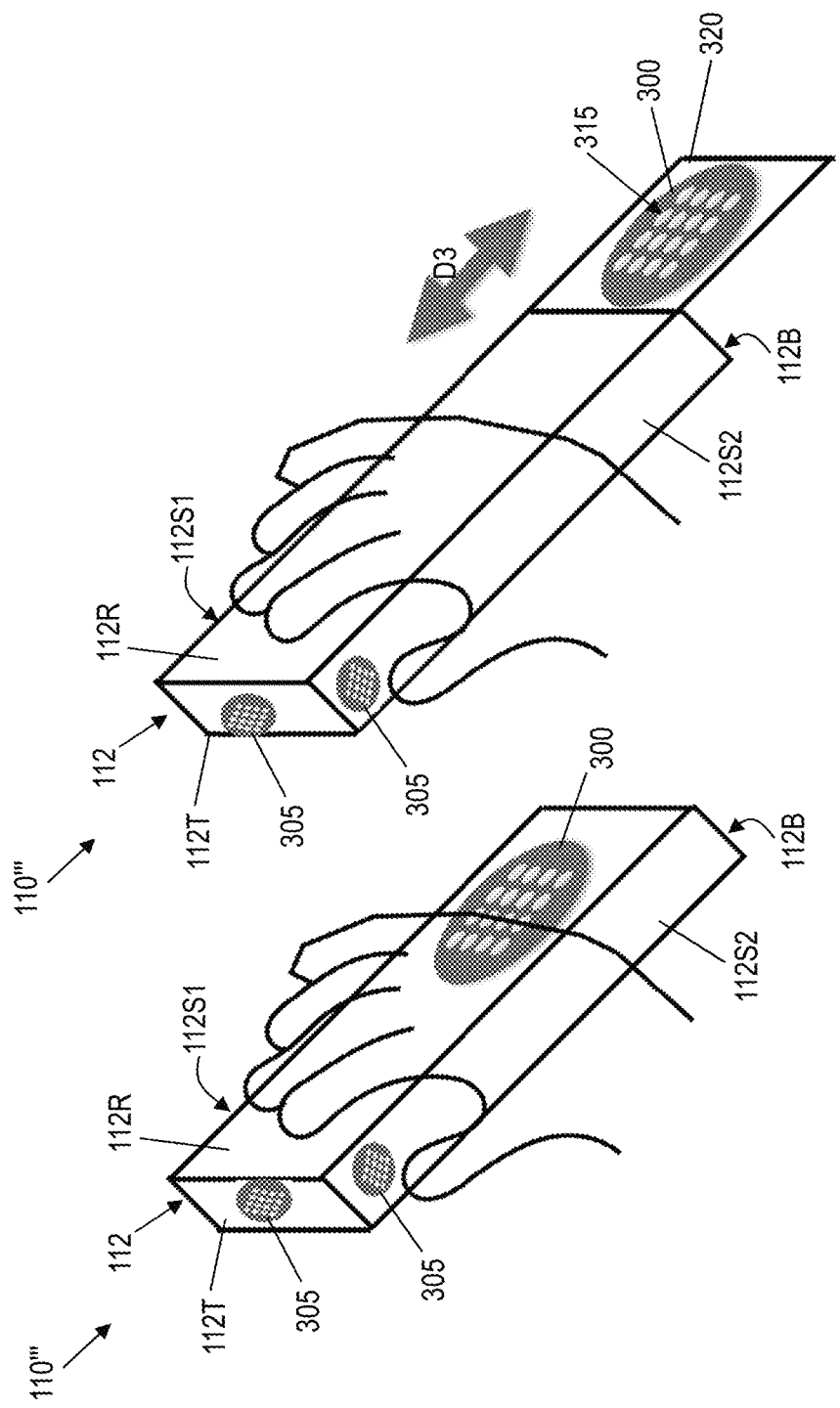
FIGS. 11A and 11B show a device in accordance with aspects of the invention.

FIGS. 11A and 11B show another embodiment of device 110''' in accordance with aspects of the invention. In embodiments, device 110''' is similar to device 110 except in aspects described differently herein. The embodiment shown in FIGS. 11A and 11B is the same as that shown in FIGS. 10A and 10B, except that in the embodiment shown in FIGS. 11A and 11B the slidable structure 320 (and thus the antenna structure 300) extend outward at or near the bottom side housing wall 112B (as opposed to near the top side housing wall 112T as in FIGS. 10A and 10B).

Figure 12B:
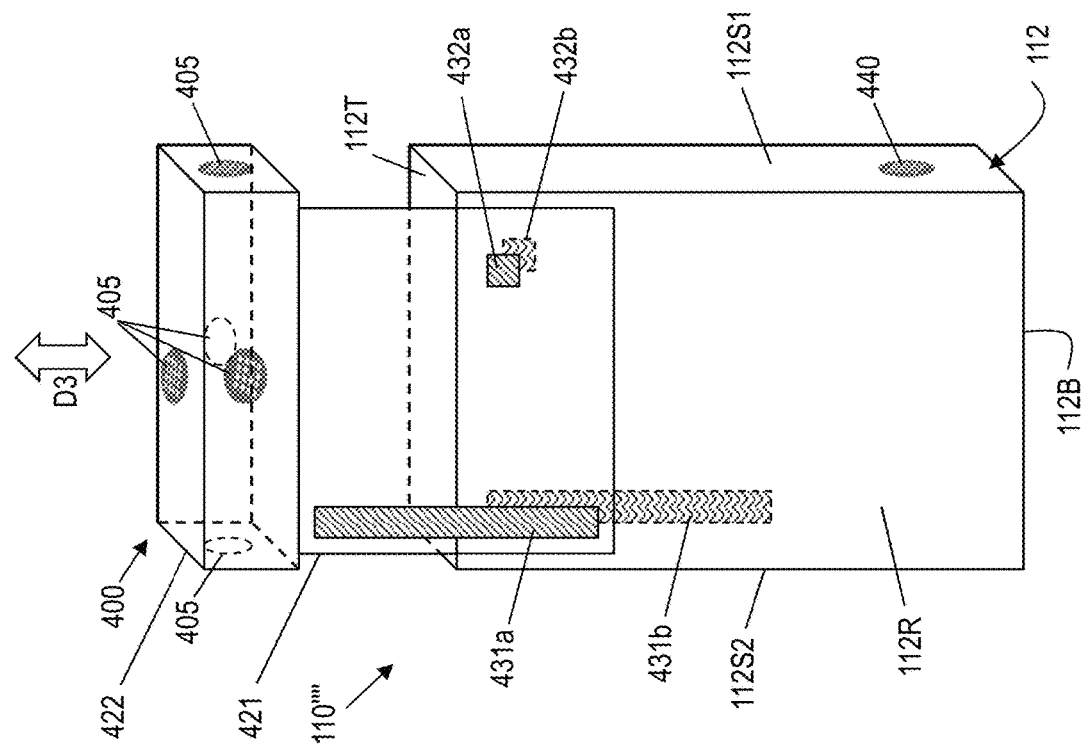
FIGS. 12A and 12B show a device in accordance with aspects of the invention.
Figure 12A:
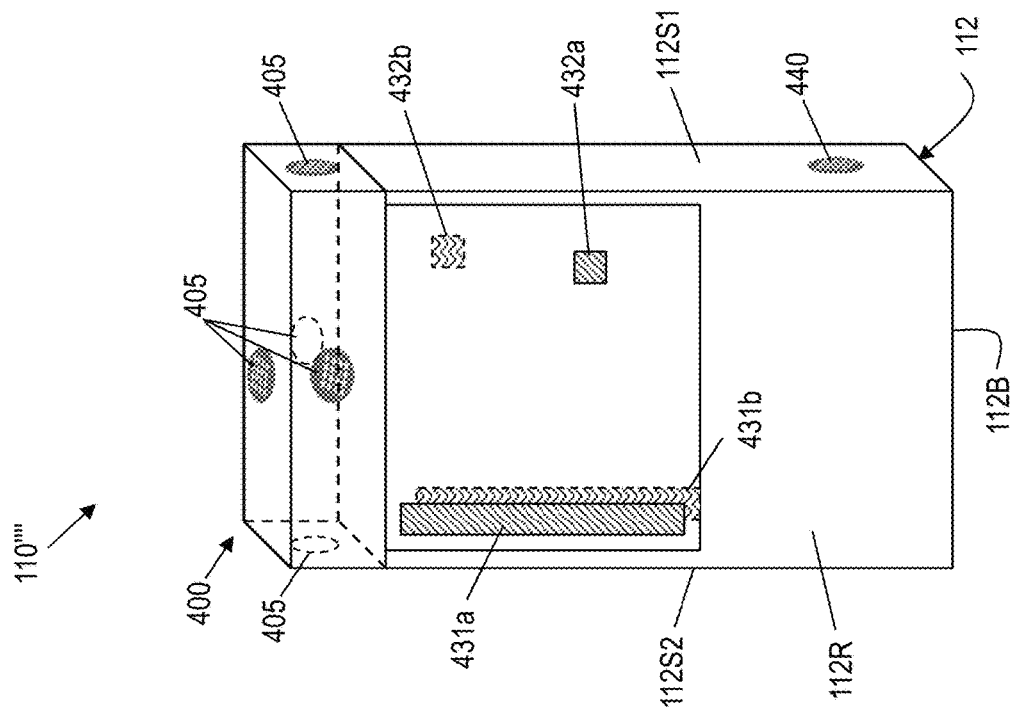

FIGS. 12A and 12B show another embodiment of device 110'''' in accordance with aspects of the invention. In embodiments, device 110'''' is similar to device 110 except in aspects described differently herein. The embodiment shown in FIGS. 12A and 12B is similar to that shown in FIGS. 10A and 10B in that an extendable and retractable antenna structure 400 is integrally connected to the housing 112 and configured for translational movement relative to the housing 112 in the direction indicated by arrow D3 (e.g., that is substantially parallel to a plane of the rear housing wall 112R and orthogonal to a plane of the top housing wall 112T). The antenna structure 400 may be slidably connected to the housing 112 in any suitable manner.

In embodiments, the antenna structure 400 includes a first portion 421 and a second portion 422. The first portion 421 may be retractable into a cavity defined inside device 110'''' or may be an outer surface of device 110''''. The first portion 421 may comprise first and second side edges that are slidably contained in grooves or slots defined by the housing 112 and that extend parallel to the direction D3 that is substantially parallel to a plane of the rear housing wall 112R and substantially orthogonal to a plane of the top side housing wall 112T. In one exemplary implementation, the first portion 421 is inside device 110" when the antenna structure 400 is in the retracted position. In this embodiment, device 110'''' comprises an aperture at or near the top side housing wall 112T, and the first portion 421 extends outward through the aperture when the antenna structure 400 is moved to the extended position. The antenna structure 400 may be composed of any suitable material or combination of materials including but not limited to plastic, metal, and composite materials.

In this embodiment, the second portion 422 of the antenna structure 400 is at a distal end of the first portion 421 and has at least five different antenna arrays 405 on five different surfaces, each facing in a different direction from the others. For example, a first antenna array 405 faces outward from a first side surface of the antenna structure 400 that is substantially aligned with the first side housing wall 112S1; a second antenna array 405 faces outward from a second side surface of the antenna structure 400 that is substantially aligned with the second side housing wall 112S2; a third antenna array 405 faces outward from a rear side surface of the antenna structure 400 that is substantially aligned with the rear housing wall 112R; a fourth antenna array 405 faces outward from a front side surface of the antenna structure 400 in a direction opposite the rear housing wall 112R; and a fifth antenna array 405 faces outward from a top side surface of the antenna structure 400 that is substantially aligned with the topside housing wall 112T.

As shown in FIGS. 12A and 12B, device 110'''' may include one or more additional phased array antenna arrays 440 on peripheral sides including the first side housing wall 112S1, the second side housing wall 112S2, and the bottom side housing wall 112B. Each of the arrays 405 and 440 includes plural phased array antenna elements (e.g., antenna elements 15-1, 15-2, . . . , 15-i) of a phased array antenna system (e.g., phased array antenna system 10). In embodiments, each of the arrays 405 and 440 are electrically connected to the control circuitry of device 110'''' and are configured for supporting millimeter wave communications including 5G. In embodiments, each of the arrays 405 and 440 are controlled by the control circuitry of device 110'''' independently of one another. With this type of arrangement, an unblocked one of arrays 405 and 440 may be switched into use and, once switched into use, the phased array antenna may use beam steering to optimize wireless performance. Similarly, if one of arrays 405 and 440 does not face or have a line of sight to an external device, then another one of arrays 405 and 440 that has line of sight to the external device may be switched into use and that phased array antenna may use beam steering to optimize wireless performance. Configurations in which antennas from one or more different locations in the device are operated together may also be used.

Each array 405 and 440 may have any number of antenna elements of any suitable size, shape, and pattern. One exemplary pattern is a 4×4 array as shown in FIG. 1. Another exemplary pattern is a 1×8 array that can be arranged on relatively narrow planar surfaces.

As shown in FIG. 12B, when the antenna structure 400 is extended outward from the rear housing wall 112R, a user may hold device 110'''' with their hand around the rear housing wall 112R, such that the user's hand that is positioned in this manner does not cover the arrays 405. In this manner, the user's hand that is holding device 110'''' does not block millimeter wave signals that are transmitted and/or received by the antenna elements of the arrays 405. This is advantageous because it avoids attenuation of the millimeter wave signals (including 5G signals) that can occur when a user's hand covers (e.g., physically obstructs) the antenna elements of an extremely high frequency antenna.

In embodiments, a flexible transmission line (e.g., similar to flexible transmission line 240) connects the arrays 405 to the control circuitry of device 110''''. In this manner, the control circuitry of device 110'''' maintains an operative physical connection with the antenna elements of the arrays 405 as the antenna structure 400 moves between the extended and retracted positions.

In other embodiments, sliding conductive contacts are used to provide electrical connection between the control circuitry located in the housing 112 and the antenna elements of the various arrays 405 on the antenna structure 400. In one exemplary implementation, a first sliding contact 431a is on the first portion 421 of the antenna structure 400 and a corresponding second sliding contact contact 431b is on the housing 112 or on a surface of device 110'''' inside the housing 112. The first sliding contact 431a is electrically connected to the antenna elements of the various arrays 405, and the second sliding contact 431 is electrically connected to the control circuitry of device 110''''. As shown in FIGS. 12A and 12B, the first sliding contact 431a and the second sliding contact 431b remain in physical contact with one another at all positions of the antenna structure 400 relative to the housing 112. In this manner, the contacts 431a and 431b maintain an electrical connection between the arrays 405 and the control circuitry of device 110'''' when the antenna structure 400 is in the retracted position, the extended position, and other positions in between. These sliding contacts may be used in the embodiment shown in FIGS. 10A and 10B, and also in the in the embodiment shown in FIGS. 11A and 11B, in addition to or in lieu of a flexible transmission line.

In accordance with aspects of the invention, device 110'''' may include a switch or other mechanism that is used to determine when the antenna structure 400 is in the extended position. In embodiments, a first conductive switch element 432a is on the first portion 421 of the antenna structure 400 and a corresponding second conductive switch element 432b is on the housing 112 or on a surface of device 110'''' inside the housing 112. As shown in FIGS. 12A and 12B, the switch elements are sized and located relative to one another that they are not in physical contact with each other when the antenna structure 400 is in the retracted position, and they are in physical contact with each other when the antenna structure 400 is in the extended position. In embodiments, the second conductive switch element 432b is electrically connected to the control circuitry of device 110'''', which is programmed to detect the contact between the elements 432a, 432b. In this manner, based on detecting this contact between the switch elements, the control circuitry of device 110'''' is configured to determine when the antenna structure 400 is in the extended position. These switch elements may be used in the embodiment shown in FIGS. 10A and 10B, and also in the in the embodiment shown in FIGS. 11A and 11B, to determine when the slidable structure in those embodiments is in the extended position.

Similar to that described at FIGS. 7A and 7B, the implementation shown in FIGS. 12A and 12B may be configured in either a passive embodiment (e.g., the antenna structure 400 includes only passive antenna components, such as antenna elements and transmission lines) or an active embodiment (e.g., the antenna structure 400 includes both passive and active antenna components).

Figures 13A, 13B:
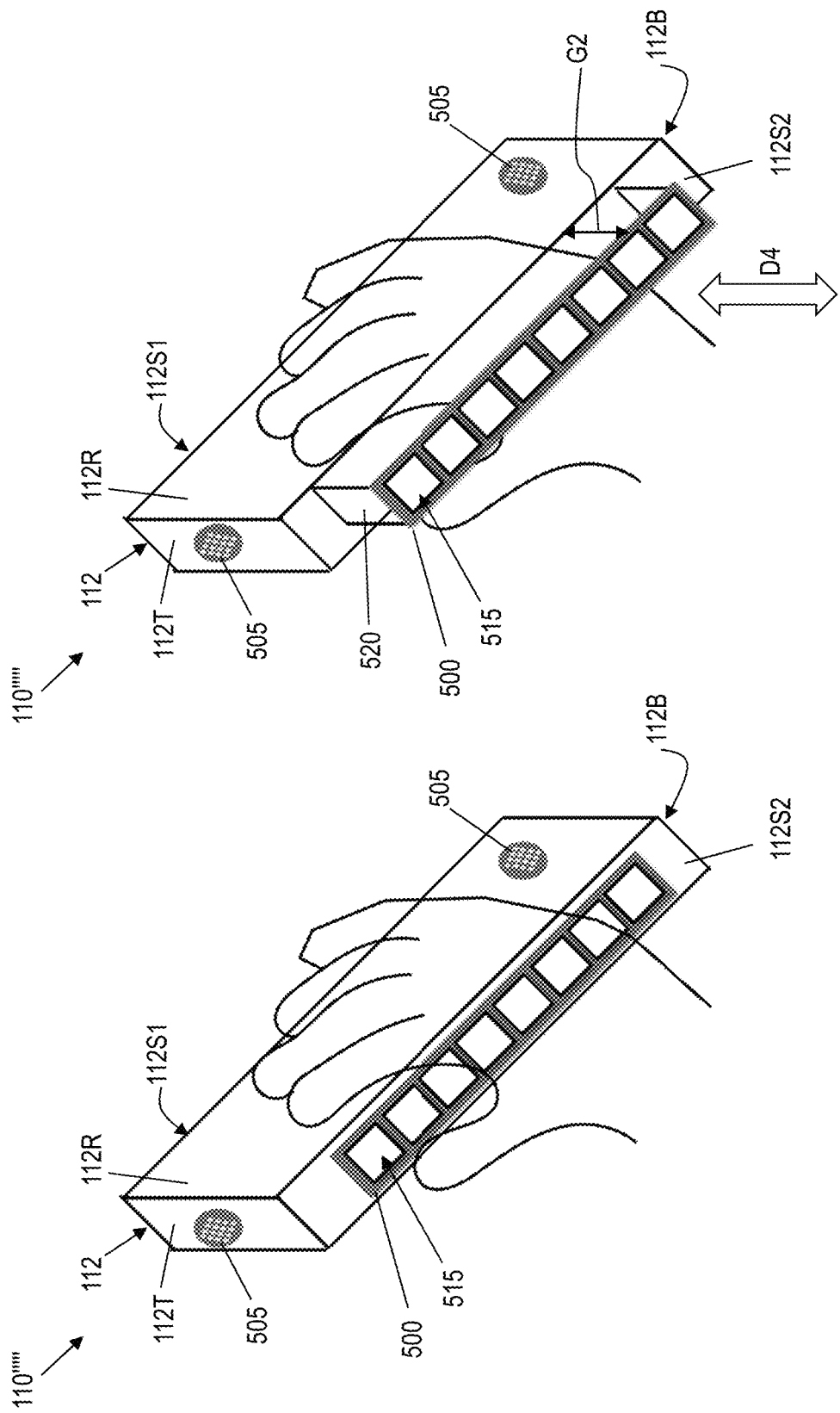
FIGS. 13A and 13B show a device in accordance with aspects of the invention.

FIGS. 13A and 13B show another embodiment of device 110'''' in accordance with aspects of the invention. In embodiments, device 110'''' is similar to device 110 except in aspects described differently herein. The embodiment shown in FIGS. 13A and 13B includes an extendable and retractable phased array antenna structure 500 integrated with the housing 112 at the second side housing wall 112S2. In embodiments, the structure 500 includes antenna elements 515 (e.g., antenna elements 15-1, 15-2, . . . , 15-i) of a phased array antenna system (e.g., phased array antenna system 10) that may be used for wireless communication (e.g., 5G) between device 110'''' and other devices. In the example shown, the antenna structure 500 includes a 1×8 array of elements 515, although other arrays may be used. In embodiments, the structure 500 includes a material that houses the antenna elements 515 and their associated circuitry.

In accordance with aspects of the invention, the antenna elements 515 face outward from device 110'''', e.g., in a direction D4 outward from and orthogonal to a planar surface of the second side housing wall 112S2. As shown in FIG. 13B, when the antenna structure 500 is extended outward from the second side housing wall 112S2, a user may hold device 110'''' with their hand in a space formed between the second side housing wall 112S2 and the antenna structure 500, such that the user's hand that is positioned in this manner does not cover the antenna elements 515. In this manner, the user's hand that is holding device 110'''' does not block millimeter wave signals that are transmitted and/or received by the antenna elements 515. This is advantageous because it avoids attenuation of the millimeter wave signals (including 5G signals) that can occur when a user's hand covers (e.g., physically obstructs) the antenna elements of an extremely high frequency antenna.

Still referring to FIGS. 13A and 13B, in embodiments, device 110'''' has additional phased array antenna arrays 505 on one or more of the other the peripheral sides including the first side housing wall 112S1, the rear housing wall 112R, the top side housing wall 112T, and the bottom side housing wall 112B. Each of the arrays 505 includes plural phased array antenna elements (e.g., antenna elements 15-1, 15-2, . . . , 15-i) of a phased array antenna system (e.g., phased array antenna system 10). In embodiments, each of the arrays 505 and the antenna structure 500 are electrically connected to the control circuitry of device 110'''' and are configured for supporting millimeter wave communications including 5G. In embodiments, each of the arrays 505 and the antenna structure 500 are controlled by the control circuitry of device 110'''' independently of one another. With this type of arrangement, an unblocked one of arrays 505 or antenna structure 500 may be switched into use and, once switched into use, the phased array antenna may use beam steering to optimize wireless performance. Similarly, if one of arrays 505 or antenna structure 500 does not face or have a line of sight to an external device, then another one of arrays 505 or antenna structure 500 that has line of sight to the external device may be switched into use and that phased array antenna may use beam steering to optimize wireless performance. Configurations in which antennas from one or more different locations in the device are operated together may also be used.

According to aspects of the invention, the antenna structure 500 is connected to the housing 112 by at least one extendable and retractable element 520. In the embodiment shown in FIGS. 13A and 13B, there are two elements 520 at opposite ends of the antenna structure 500. In the embodiment shown in FIGS. 13A and 13B, the two elements 520 are slidably held in respective slots in the housing 112. In this manner, the elements 520 disappear from view when the antenna structure 500 is moved to the retracted position (FIG. 13A). As shown in FIG. 13B, the at least one element 520 is sized such that there is a gap G2 between the antenna structure 500 and the housing 112 when the antenna structure 500 is in the extended position. In embodiments, the components of device 110'''' are sized and shaped such that the gap G2 is of a size sufficient to accommodate the fingers or hand of a user holding device 110'''' (e.g., as illustrated in FIG. 13B). In embodiments, the gap G2 has a value in a range between 0.5 inches and 1.0 inches, although other values may be used to accommodate different finger sizes.

In one exemplary implementation, the antenna structure 500 is sized and shaped to fit substantially flush with an outer surface of the second side housing wall 112S2 when the antenna structure 500 is in the retracted position (e.g., FIG. 13A). In this implementation, the antenna structure 500 may be arranged in a cavity in the second side housing wall 112S2, e.g., in a manner similar to that shown in FIGS. 7A and 7B. Similar to the arrangement of FIG. 7A, the substantially flush retracted position is configured to reduce the snag potential of the edges of the antenna structure 500, e.g., when device 110'''' is slid into or out of a pocket. In this implementation, the antenna structure 500 may include a latch mechanism that selectively engages the housing 112 when the antenna structure 500 is in the retracted position, and that the user can selectively cause to disengage from the housing 112 to cause the antenna structure 500 to move outward to the extended position (FIG. 13B).

In another exemplary implementation, the antenna structure 500 rests against the outer surface of the second side housing wall 112S2 when the antenna structure 500 is in the retracted position. In one example of this implementation, the second side housing wall 112S2 may include at least one sloped surface (e.g., similar to sloped surface 250 shown in FIG. 8A) that has a height similar to the height of the antenna structure 500 along the direction D4. Similar to the arrangement of FIG. 8A, the at least one sloped surface on the second side housing wall 112S2 is configured to reduce the snag potential of the edges of the antenna structure 500, e.g., when device 110'''' is slid into or out of a pocket.

In another example of this implementation, the antenna structure 500 may include at least one sidewall (e.g., similar to sidewall 260 shown in FIG. 9A). Similar to the arrangement of FIG. 9A, the at least one sidewall is arranged at an acute angle such that it is configured to reduce the snag potential of the edges of the antenna structure 500, e.g., when device 110'''' is slid into or out of a pocket.

In embodiments, a flexible transmission line (e.g., similar to flexible transmission line 240 shown in FIGS. 7A and 7B) connects the antenna elements 515 to the control circuitry of device 110''''. In this manner, the control circuitry of device 110'''' maintains an electrical connection with the antenna elements 515 as the antenna structure 500 moves between the extended and retracted positions. Other electrical connections may be used, including ones similar to those shown in FIGS. 12A and 12B, as but one example.

Similar to that described at FIGS. 7A and 7B, the implementation shown in FIGS. 13A and 13B may be configured in either a passive embodiment (e.g., the antenna structure 500 includes only passive antenna components, such as antenna elements 515 and transmission lines) or an active embodiment (e.g., the antenna structure 500 includes both passive and active antenna components).

Figure 14:
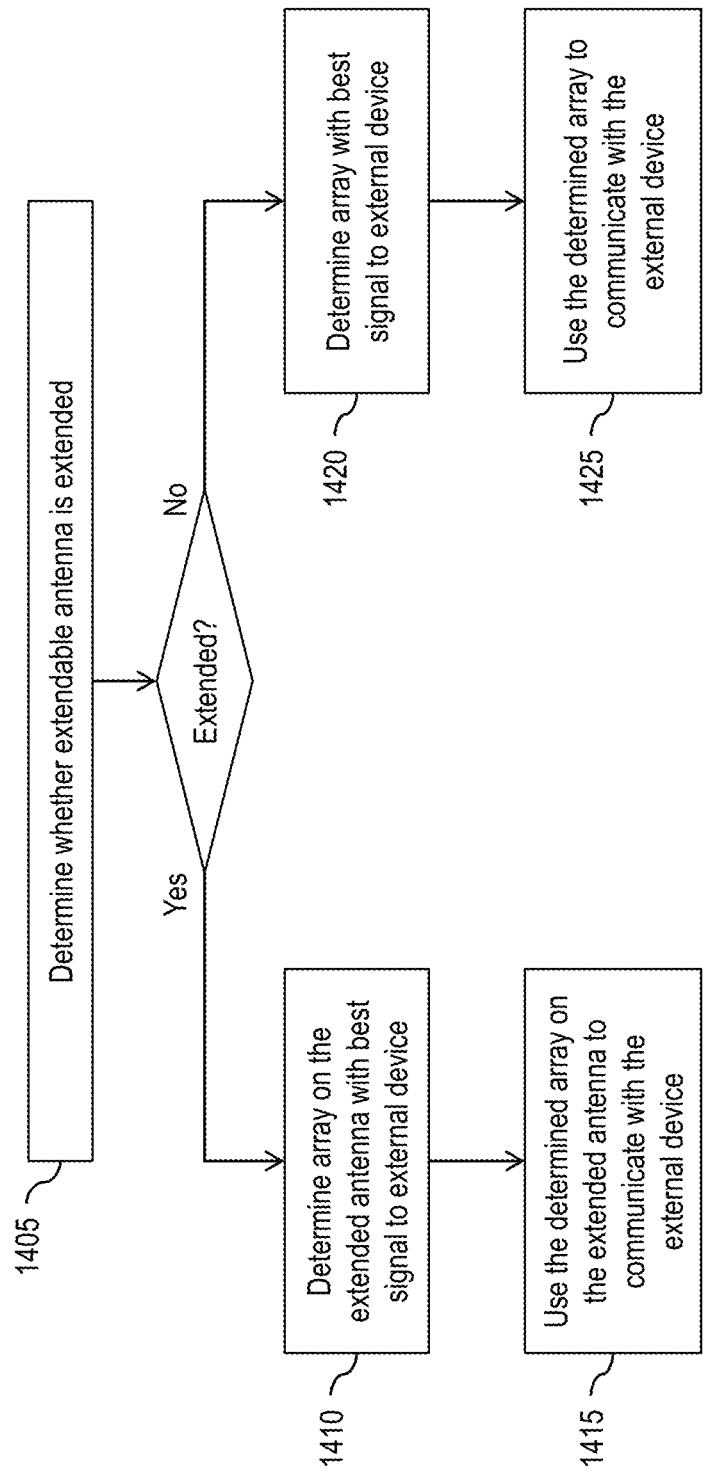
FIG. 14 shows a flowchart of an exemplary method in accordance with aspects of the invention.

FIG. 14 shows a flowchart of an exemplary method in accordance with aspects of the invention. In embodiments, the steps of the method are performed by control circuitry in a device as described herein (e.g., one of devices 110, 110', 110'', 110''', 110'''', 110''''') when using one or more phased array antennas to communicate wirelessly with an external device, such as during 5G communication between the device and the external device. The steps of the method are described using reference numbers of elements described herein when appropriate.

At step 1405, the control circuitry in the device determines whether an extendable antenna structure of the device is in the extended position. In embodiments, the extendable antenna structure may comprise one of: antenna structure 200 of FIGS. 6A and 6B; antenna structure 300 of FIGS. 10A and 10B, 10C and 10D, or FIGS. 11A and 11B; antenna structure 400 of FIGS. 12A and 12B; antenna structure 500 of FIGS. 13A and 13B. In embodiments, the control circuitry uses a switch or other sensor or detection mechanism to determine whether the extendable antenna structure of the device is in the extended position or the retracted position. For example, the control circuitry may make the determination at step 1405 using a switch similar to that described with respect to switch elements 432a and 432b described herein.

In the event the control circuitry determines at step 1405 that the extendable antenna structure of the device is in the extended position, then the process proceeds to step 1410. In the event the control circuitry determines at step 1405 that the extendable antenna structure of the device is not in the extended position, then the process proceeds to step 1420.

At step 1410, the control circuitry determines a phased array antenna on the extended extendable antenna structure with a best signal to the external device with which the device is communicating. In embodiments where the extendable antenna structure has only a single phased array antenna, then the control circuitry deems this single phased array antenna as the phased array antenna on the extended extendable antenna structure with a best signal to the external device. In embodiments where the extendable antenna structure has plural different phased array antennas (e.g., as depicted in FIG. 12B), then the control circuitry determines which of the plural different phased array antennas has the best signal to the external device based on comparing transmit-receive conditions of the plural different phased array antennas. In embodiments, the transmit-receive conditions used in the comparison may include at least one of: strength of signal between the device and the external device for each respective one of the plural different phased array antennas; and signal to noise ratio for each respective one of the plural different phased array antennas. Based on comparing the transmit-receive conditions of the plural different phased array antennas, the control circuitry deems one of the plural different phased array antennas as having the best signal to the external device.

At step 1415, the control circuitry uses the determined phased array antenna on the extended extendable antenna structure having the best signal to the external device, as determined at step 1410, to communicate with the external device. In embodiments, step 1415 comprises the control circuitry causing the determined phased array antenna to transmit signals to and/or receive signals from the external device, e.g., using millimeter wave signals such as 5G signals. In embodiments, step 1415 comprises the control circuitry determining an optimal direction (e.g., similar to direction A shown in FIG. 1), and controls the determined phased array antenna to form a beam in the determined optimal direction (e.g., as described with respect to FIGS. 1 and 2) to facilitate wireless communication with the external device.

At step 1420, the control circuitry determines a phased array antenna with a best signal to the external device with which the device is communicating. In embodiments, the determination at step 1420 takes into account all of the phased array antennas on the device, including those on the extendable antenna structure and those not on the extendable antenna structure. Examples of a phased array antenna that is not on the extendable antenna structure include: arrays 205; arrays 305; arrays 440; and arrays 505.

In embodiments, the control circuitry determines which of the plural different phased array antennas on the device has the best signal to the external device based on comparing transmit-receive conditions of the plural different phased array antennas. In embodiments, the transmit-receive conditions used in the comparison may include at least one of: strength of signal between the device and the external device for each respective one of the plural different phased array antennas; and signal to noise ratio for each respective one of the plural different phased array antennas. Based on comparing the transmit-receive conditions of all the plural different phased array antennas on the device, the control circuitry deems one of the plural different phased array antennas as having the best signal to the external device.

At step 1425, the control circuitry uses the determined phased array antenna, as determined at step 1420, to communicate with the external device. In embodiments, step 1425 comprises the control circuitry causing the determined phased array antenna to transmit signals to and/or receive signals from the external device, e.g., using millimeter wave signals such as 5G signals. In embodiments, step 1425 comprises the control circuitry determining an optimal direction (e.g., similar to direction A shown in FIG. 1), and controls the determined phased array antenna to form a beam in the determined optimal direction (e.g., as described with respect to FIGS. 1 and 2) to facilitate wireless communication with the external device.

In accordance with aspects of the invention, the method of FIG. 14 includes a preference to use an antenna on the extendable antenna structure in situations when the extendable antenna structure is in the extended position. However, when the extendable antenna structure is not in the extended position, the method then selects the best array from all the arrays on the device those on the extendable antenna structure and those not on the extendable antenna structure.

Figure 15:
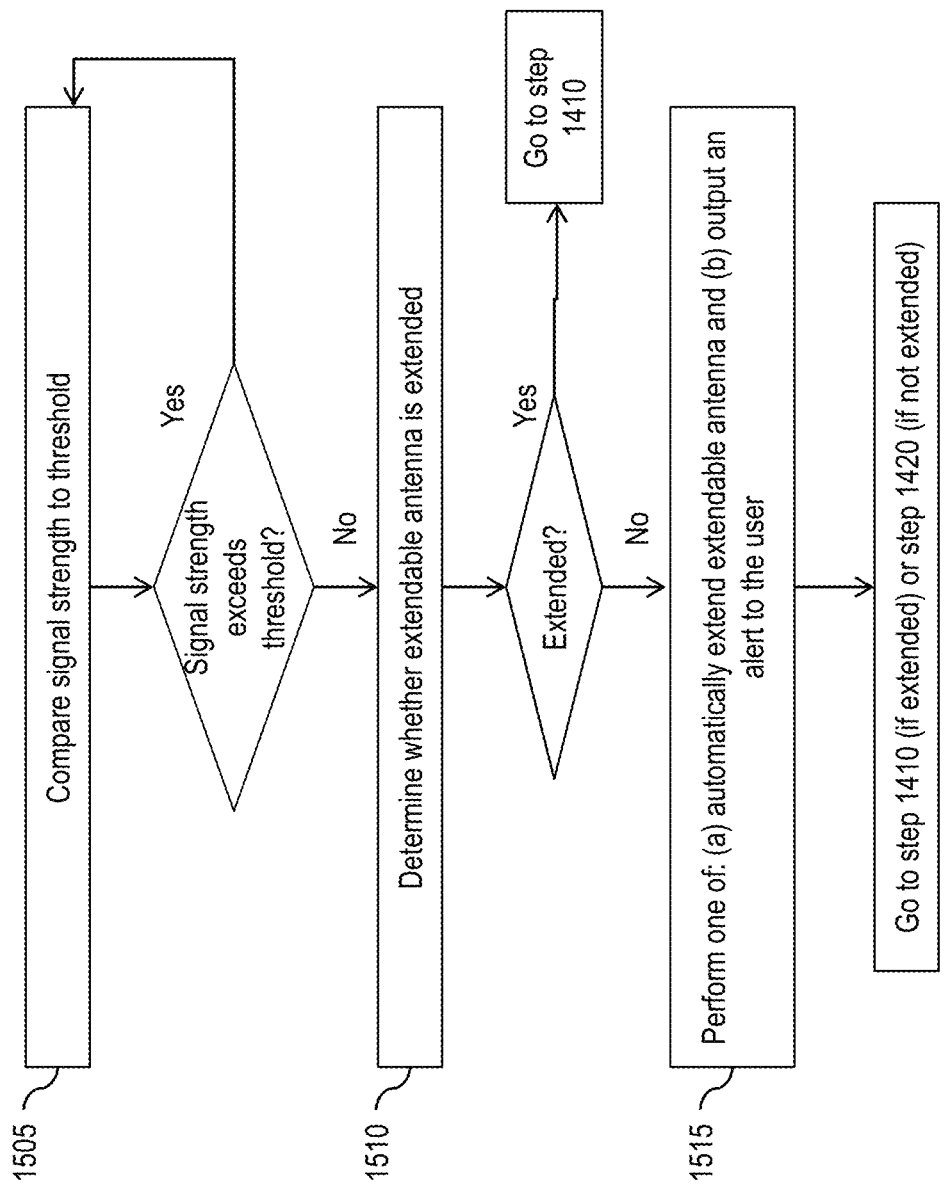
FIG. 15 shows a flowchart of an exemplary method in accordance with aspects of the invention.

FIG. 15 shows a flowchart of an exemplary method in accordance with aspects of the invention. In embodiments, the steps of the method are performed by control circuitry in a device as described herein when using one or more phased array antennas to communicate wirelessly with an external device, such as during 5G communication between the device and the external device. The steps of the method are described using reference numbers of elements described herein when appropriate.

At step 1505, the control circuitry in the device compares the signal strength of the device to a threshold value. In embodiments, when the device is using one or more phased array antennas to communicate wirelessly with an external device, the control circuitry uses conventional techniques to determine the current signal strength of the wireless communication of the one or more in-use phased array antennas. In embodiments, the threshold value is defined by data stored in the device and accessed by the control circuitry for this comparison.

In the event the control circuitry determines at step 1505 that the signal strength exceeds the threshold value, then the process loops back to step 1505. In this manner, the control circuitry continuously monitors the signal strength until such time as the signal strength drops below the threshold value. In the event the control circuitry determines at step 1505 that the signal strength does not exceed the threshold value, then the process proceeds to step 1510.

At step 1510, the control circuitry in the device determines whether the extendable antenna structure of the device is in the extended position. Step 1510 may be performed in a manner similar to that described with respect to step 1405.

In the event the control circuitry determines at step 1510 that the extendable antenna is extended, then the process proceeds to step 1410 of FIG. 14. In this manner, the control circuitry determines a phased array antenna on the extended extendable antenna structure with a best signal to the external device with which the device is communicating (step 1410) and then uses the determined phased array antenna to communicate with the external device (step 1415).

In the event the control circuitry determines at step 1510 that the extendable antenna is not extended, then the process proceeds to step 1515.

At step 1515, as a result of determining that both conditions are satisfied (i.e., the signal strength is less than the threshold value and the extendable antenna is in the retracted position), the control circuitry performs one of two functions. The first function is automatically extending the extendable antenna structure to the extended position. In embodiments, and as described with respect to FIGS. 10A and 10B, the control circuitry automatically actuates the actuator 323 to move the antenna structure 320 to the extended position. In embodiments, after automatically extending the extendable antenna structure, the process goes to step 1410 of FIG. 14 as described above (e.g., to determine and utilize an optimal phased array antenna on the extendable antenna structure).

The second function at step 1515 is outputting an alert to the user. In embodiments, and as described with respect to FIGS. 10A and 10B, the control circuitry outputs an audio and/or video and/or haptic alert to the user. The alert may indicate, for example, that the signal strength is low and that the user should manually move the slidable structure 320 from the retracted position to the extended position, or that the user provide input to device 110" to cause the actuator 323 to move the slidable structure 320 from the retracted position to the extended position.

In embodiments, after outputting the alert to the user, the control circuitry determines whether the extendable antenna structure in the extended position. In some situations, the user may choose to extend the extendable antenna structure in response to the alert. In some other situations, the user may choose to not extend the extendable antenna structure in response to the alert. When the control circuitry determines that the user has extended the extendable antenna structure, then the process proceeds to step 1410 of FIG. 14 as already described. When the control circuitry determines that the user has not extended the extendable antenna structure, then the process proceeds to step 1420 of FIG. 14, where the control circuitry determines and utilizes an optimal phased array antenna from all the available ones on the device.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An electronic device, comprising:
    a housing;
    a display; and
    an extendable phased array antenna structure integrated with the housing and moveable relative to the housing between a retracted position and an extended position;
    wherein the extendable phased array antenna structure comprises an array of antenna elements that are configured to form a beam in a determined direction, and
    wherein the extendable phased array antenna structure, when extended, forms a space between the extendable phased array antenna structure and the housing that fits a hand of a user holding the electronic device.

2. The electronic device of claim 1, wherein the antenna elements in the extendable phased array antenna structure face away from the housing.

3. The electronic device of claim 1, further comprising additional phased array antenna arrays on or in the housing.

4. The electronic device of claim 1, wherein the antenna elements are configured to operate between 10 GHz and 300 GHz.

5. The electronic device of claim 1, further comprising a flexible transmission line that connects the antenna elements in the extendable phased array antenna structure to control circuitry in the housing.

6. The electronic device of claim 1, wherein the extendable phased array antenna structure includes passive antenna components and is devoid of active antenna components.

7. The electronic device of claim 1, wherein the extendable phased array antenna structure includes both passive antenna components and active antenna components.

8. The electronic device of claim 1, further comprising a switch that is used to determine when the extendable phased array antenna structure is retracted and when the extendable phased array antenna structure is extended.

9. The electronic device of claim 1, wherein the extendable phased array antenna structure translates relative to the housing in a direction that is parallel to a plane of a rear housing wall of the housing.

10. The electronic device of claim 9, wherein the extendable phased array antenna structure comprises an outer surface of the device.

11. The electronic device of claim 9, wherein the extendable phased array antenna structure extends outward from an aperture in the housing.

12. The electronic device of claim 1, wherein the extendable phased array antenna structure has four sides and a respective phased array antenna on each one of the four sides.

13. The electronic device of claim 1, wherein the extendable phased array antenna structure extends outward from a side surface of the housing.

14. A method of using the electronic device of claim 1, the method comprising:
    determining whether the extendable phased array antenna structure is in the extended position or the retracted position; and
    based on the determining, performing one of:
        (i) when the extendable phased array antenna structure is in the extended position, determining an array on the extendable phased array antenna structure with a best signal to an external device, and using the determined array on the extendable phased array antenna structure to communicate with an external device; and
        (ii) when the extendable phased array antenna structure is in the retracted position, determining an array on the electronic device with a best signal to an external device, and using the determined array on the electronic device to communicate with the external device.

15. A method of using the electronic device of claim 1, the method comprising:
    based on determining that both (i) a current signal strength is less than a predefined threshold value and (ii) the extendable phased array antenna structure is in a retracted position, performing one of:
        (a) automatically extending the extendable phased array antenna structure using an actuator; and
        (b) outputting an alert to the user.

16. An electronic device, comprising:
    a housing;
    a display; and
    an extendable phased array antenna structure integrated with the housing and moveable relative to the housing between a retracted position and an extended position;

wherein the extendable phased array antenna structure comprises an array of antenna elements that are configured to form a beam in a determined direction, and wherein the extendable phased array antenna structure extends outward from a rear housing wall of the housing.

17. The electronic device of claim 16, wherein the extendable phased array antenna structure, when in an extended position, defines a gap between the extendable phased array antenna structure and the housing, the gap being of a size sufficient to accommodate fingers of a user holding the device.

18. The electronic device of claim 17, further comprising a biasing element that biases the extendable phased array antenna structure toward the extended position, and a latch mechanism that selectively holds the extendable phased array antenna structure in a retracted position.

19. The electronic device of claim 16, further comprising an extendable structure connecting the extendable phased array antenna structure to the housing, wherein the extendable structure comprises an accordion or telescoping structure.

20. The electronic device of claim 16, wherein the extendable phased array antenna structure, when in a retracted position, has an outer surface that is substantially flush with an outer surface of the rear housing wall.

21. The electronic device of claim 16, wherein a bottom surface of the extendable phased array antenna structure abuts a planar outer surface of the rear housing wall when the extendable phased array antenna structure is in a retracted position.

22. The electronic device of claim 16, wherein a sloped surface protrudes outward from a planar outer surface of the rear housing wall, and a height of the sloped surface above the planar outer surface is substantially the same as a height of the extendable phased array antenna structure the planar outer surface when the extendable phased array antenna structure is in a retracted position.

23. The electronic device of claim 16, wherein the extendable phased array antenna structure has a sidewall that is sloped at an acute angle relative to a plane defined by an outer surface of the rear housing wall.

24. An electronic device, comprising:

a housing;

a display; and an extendable phased array antenna structure integrated with the housing and moveable relative to the housing between a retracted position and an extended position;

wherein the extendable phased array antenna structure comprises an array of antenna elements that are configured to form a beam in a determined direction, wherein the extendable phased array antenna structure extends outward from a side surface of the housing, and wherein the extendable phased array antenna structure, when in an extended position, defines a gap between the extendable phased array antenna structure and the housing, wherein the gap is size to accommodate a hand of a user holding the electronic device.

* * * * *